(12) United States Patent
Hayes

(10) Patent No.: US 7,404,274 B2
(45) Date of Patent: Jul. 29, 2008

(54) MASONRY WALL ANCHORING SYSTEM

(76) Inventor: John T. Hayes, Eng2, P.O. Box 369, Lexington, SC (US) 29071

( * ) Notice: Subject to any disclaimer, the term of this patent is extended or adjusted under 35 U.S.C. 154(b) by 560 days.

(21) Appl. No.: 10/704,974

(22) Filed: Nov. 12, 2003

(65) Prior Publication Data

US 2005/0097849 A1    May 12, 2005

(51) Int. Cl.
*E04B 1/38* (2006.01)
(52) U.S. Cl. .......................... 52/513; 52/379; 52/514.5; 411/82.1; 405/259.5
(58) Field of Classification Search .............. 52/379, 52/513, 514.5, 704; 405/259.5; 411/82.1
See application file for complete search history.

(56) References Cited

U.S. PATENT DOCUMENTS

| | | | |
|---|---|---|---|
| 3,395,625 A * | 8/1968 | Blanchette et al. ....... 405/259.5 |
| 4,063,582 A | 12/1977 | Fischer |
| 4,096,672 A | 6/1978 | Fischer et al. |
| 4,461,600 A * | 7/1984 | Norkus et al. ............ 405/259.5 |
| 4,620,406 A | 11/1986 | Hugel et al. |
| 4,730,422 A | 3/1988 | Young |
| 4,741,141 A | 5/1988 | Harke |
| 4,772,166 A | 9/1988 | Shamah et al. |
| 4,773,794 A | 9/1988 | Harke |
| 4,790,114 A | 12/1988 | Falco |
| 4,836,729 A | 6/1989 | Bisping et al. |
| 4,840,524 A * | 6/1989 | Bisping et al. ................ 411/82 |
| 4,893,974 A * | 1/1990 | Fischer et al. .............. 411/82.1 |
| 4,930,284 A * | 6/1990 | Falco ........................... 52/704 |
| 4,938,631 A | 7/1990 | Maechtle et al. |
| 4,968,185 A * | 11/1990 | Leibhard et al. ......... 405/259.5 |
| 4,993,900 A * | 2/1991 | Hugel et al. ................ 411/82.1 |
| 5,003,749 A | 4/1991 | Harke |
| 5,007,780 A * | 4/1991 | Hoffmann et al. .......... 411/82.3 |
| 5,104,266 A * | 4/1992 | Daryoush et al. ......... 405/259.5 |
| 5,134,828 A * | 8/1992 | Baur ........................... 52/704 |
| 5,216,857 A | 6/1993 | Harke |
| 5,243,805 A * | 9/1993 | Fricker ....................... 52/698 |
| 5,553,436 A | 9/1996 | Kish et al. |
| 5,644,889 A | 7/1997 | Getz |
| 5,852,907 A | 12/1998 | Tobin et al. |
| 5,881,523 A * | 3/1999 | Quatrochi, Jr. ............. 52/514.5 |
| 5,934,821 A * | 8/1999 | Shaw et al. .................... 404/62 |
| 6,039,125 A | 3/2000 | Paterson et al. |
| 6,131,360 A | 10/2000 | Dalen |
| 6,212,841 B1 | 4/2001 | Plume |
| 6,457,910 B1* | 10/2002 | Ludwig et al. ........... 405/259.1 |
| 6,837,018 B1* | 1/2005 | Hagel et al. .................. 52/698 |
| 2003/0206774 A1* | 11/2003 | Dierker .................... 405/259.2 |

FOREIGN PATENT DOCUMENTS

DE    37 33 621 A1 * 10/1987
JP    57036214 A  *  2/1982

* cited by examiner

*Primary Examiner*—Robert Canfield
(74) *Attorney, Agent, or Firm*—Wiiliam L. Klima; Klima Law Offices, PLLC

(57) ABSTRACT

An anchoring device configured for reinforcing and renovating an existing masonry wall. The anchoring device is preferable a plastic anchoring device configured to be inserted in a hole in the existing masonry wall, and then preferable expanded to securely anchor same.

12 Claims, 18 Drawing Sheets

FIG.12-B      FIG.12-D
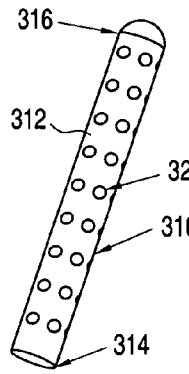
FIG.12-A
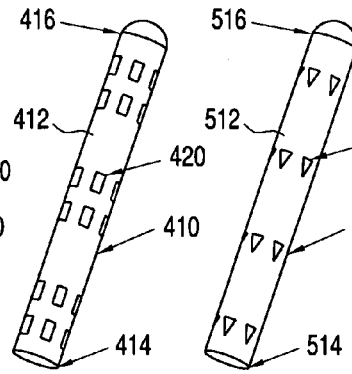
FIG.12-C
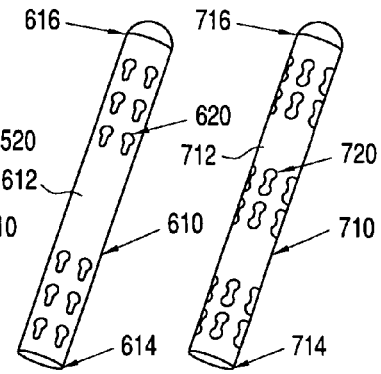
FIG.12-E
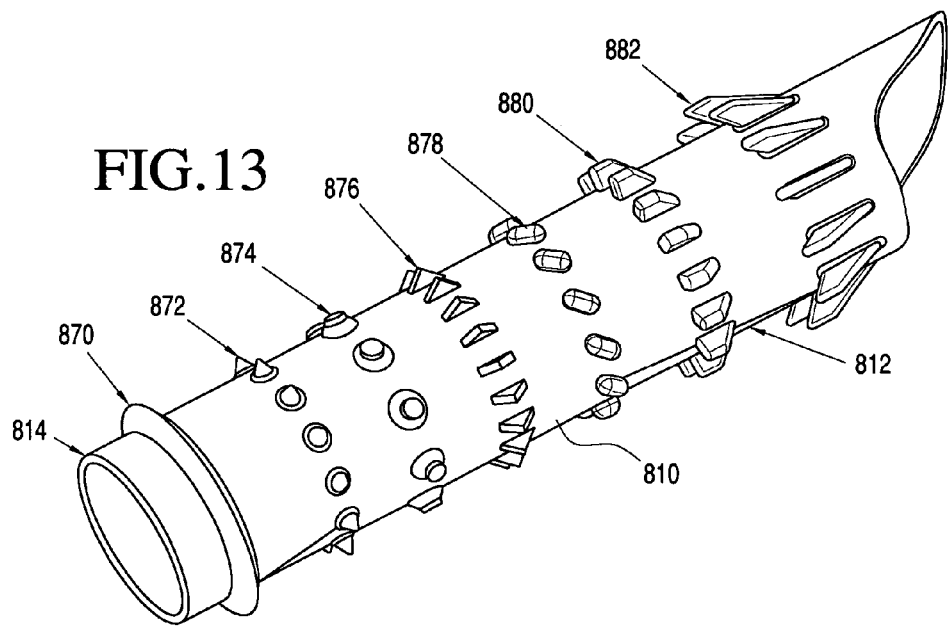
FIG.13
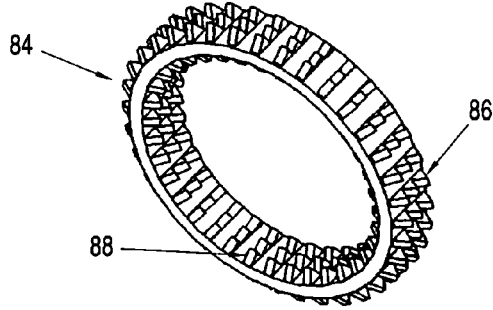
FIG.14

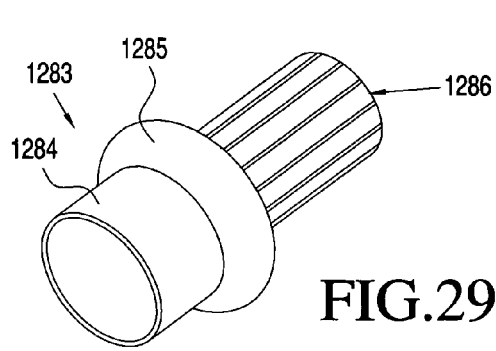
FIG.29
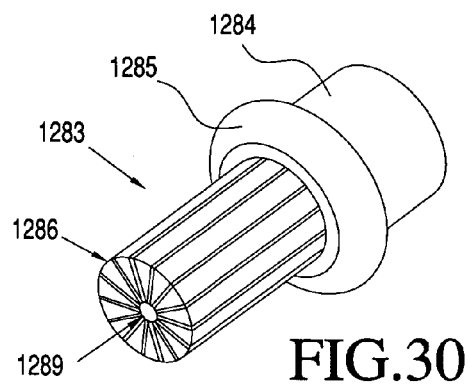
FIG.30
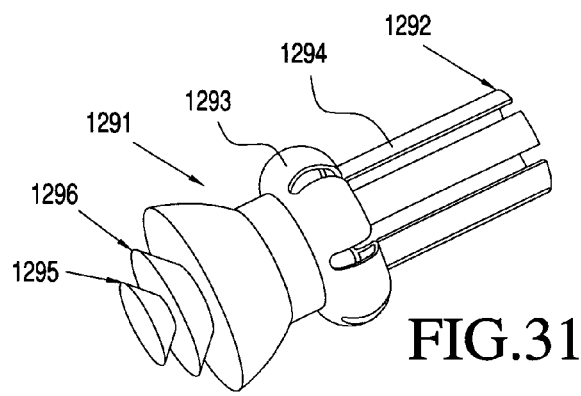
FIG.31
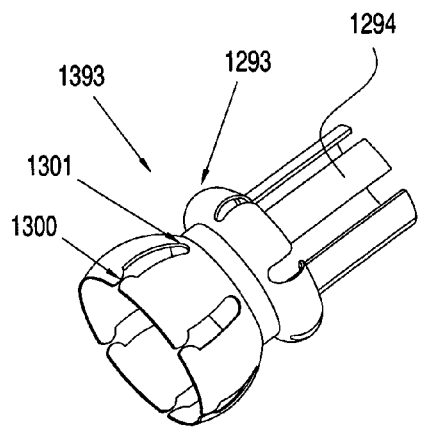
FIG.32-A
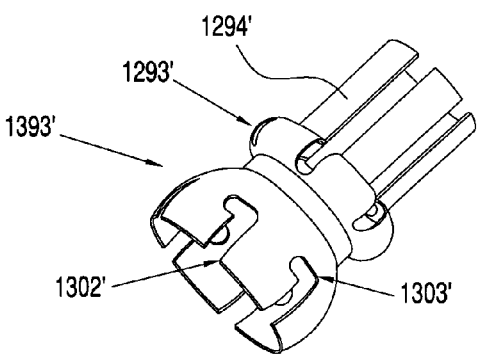
FIG.32-B

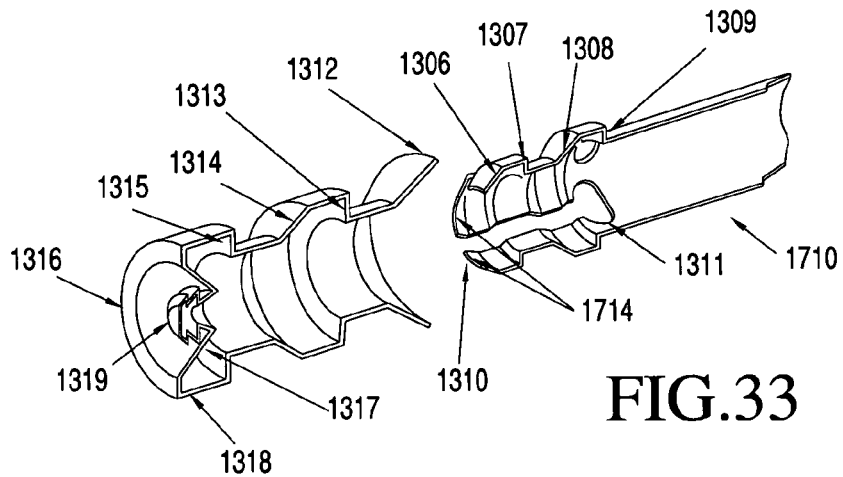
FIG.33
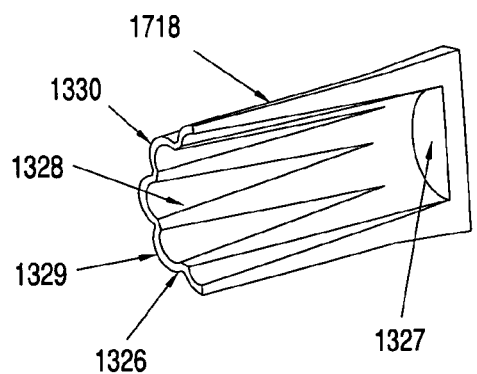
FIG.34
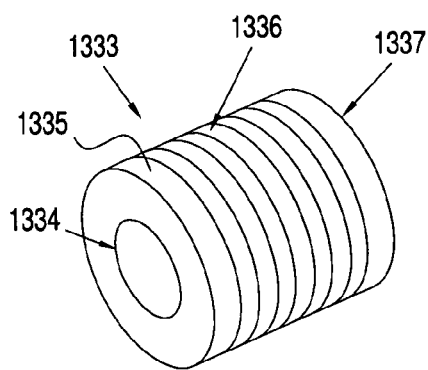
FIG.35-A
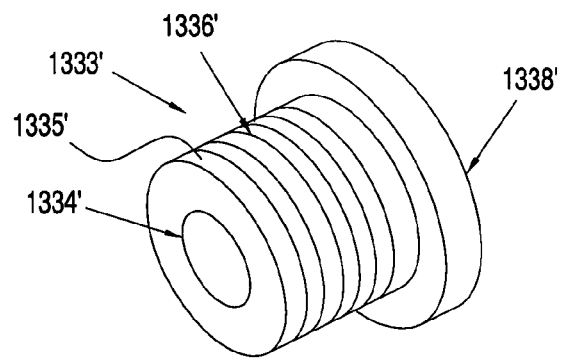
FIG.35-B

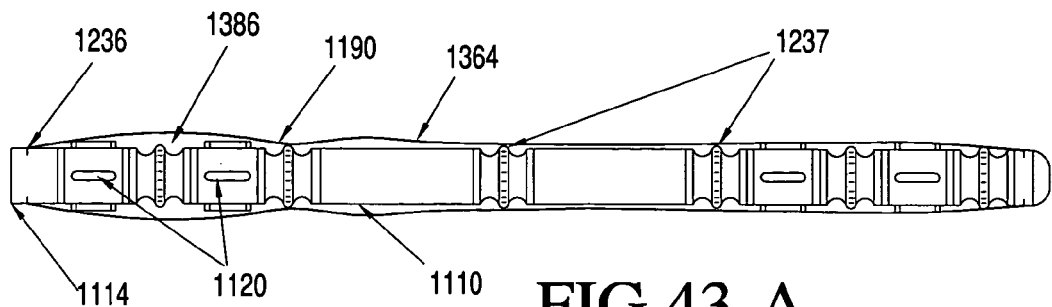
FIG.43-A
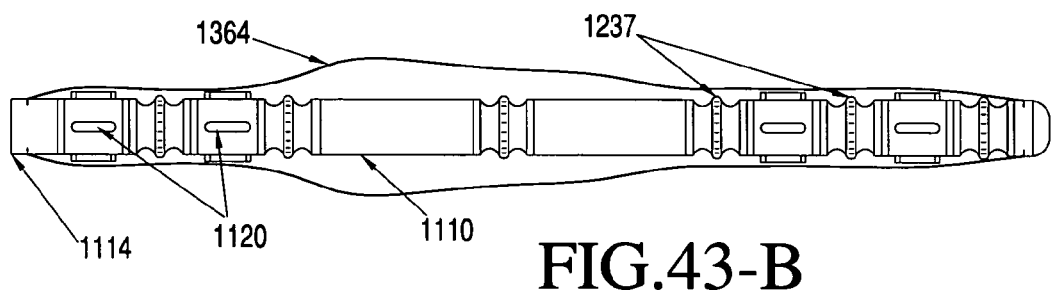
FIG.43-B
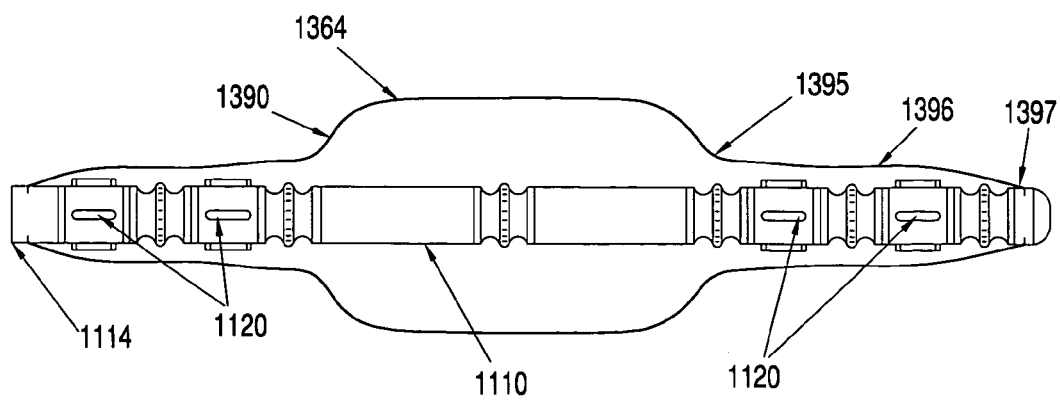
FIG.43-C

MASONRY WALL ANCHORING SYSTEM

FIELD OF THE INVENTION

The present invention is directed to a device, system and method for anchoring a masonry wall, in particular for reinforcing an existing masonry wall.

BACKGROUND OF THE INVENTION

Typically older brick buildings built during the past two-hundred and fifty (250) years have traditionally combined outer brick walls made of two (2) or more spaced apart brick wall layers. These wall layers are typically connected by cross-turned joining members called "headers". The spacing between the layers is typically left unfilled or filled with construction rubble or cement. The headers connect the outer brick wall layer to the inner brick wall layer(s). These walls are generally structural, and they often support a significant amount of the entire weight of the building structure. With time, the connection between the headers and the brick wall layers crack and separate or loosen significantly reducing the structural strength of the combined wall layers. Further, the cement between adjacent bricks on the outer brick wall exposed to the weather also cracks and separates from the surfaces of the bricks. Eventually, these walls will deteriorate with age to the extent that the wall or portions thereof will totally fail and collapse causing major structural failure of the building.

The deterioration of the combined outer wall can be greatly accelerated due to deteriorating footers supporting the brick walls. This creates enormous shear forces throughout the height of the combined outer wall causing splitting and separation between bricks. Further, seismic events such as earthquakes can shake apart a deteriorating wall within seconds, or even liquefy the soil supporting the footers, causing immediate catastrophic failure of the walls and potentially the entire building structure.

There exist a number of remedial devices and techniques for fixing and/or repairing these traditional brick wall structures. A number of these methods utilize mechanical wall anchors. In use, an installer drills numerous holes into the combined outer wall layers, and then installs a mechanical anchor in each hole. However, many of the mechanical anchors utilize a wedging or expanding type fastening within the hole, which can cause added damage and stresses to the combined outer wall. Specifically, the mechanical anchors are made of metals that are harder structurally than the more brittle cement and/or brick of the combined outer wall. When the mechanical fasteners are tightened, the expanding fastener can break or crack the surround cement and/or brick around the hole. The anchors are designed for mechanically rejoining the brick wall with the inner brick wall. Additionally, these anchors are stronger than the more brittle cement and/or brick construction units and when the combination of the anchoring device and the brittle construction units are exposed to wall movement, such as would occur during an earthquake or foundation settling, this disparity in strength results in additional fracturing and/or cracking of the brittle construction units.

Further, the use of mechanical anchors is expensive and time consuming for installation purposes. There exists a need for a more economical and faster anchoring device, system and method. Further, there is a need for better ways for anchoring the outer brick wall to the inner brick wall of a combined outer wall without damaging the existing wall structure further during installation.

SUMMARY OF THE INVENTION

A first object of the present invention is to provide an improved masonry wall anchoring device.

A second object of the present invention is to provide an improved masonry wall anchoring device at least partially made of plastic material.

A third object of the present invention is to provide an improved masonry wall anchoring device made entirely of plastic material.

A fourth object of the present invention is to provide an improved masonry wall anchoring device configured to be at least partially expandable.

A fifth object of the present invention is to provide an improved masonry wall anchoring device configured to be at least partially inflatable.

A sixth object of the present invention is to provide an improved masonry wall anchoring device configured to be at least partially irreversibly expanded or inflated.

A seventh object of the present invention is to provide an improved masonry wall anchoring device configured to be at least partially expanded or inflated by a flowable material, in particular a plastic flowable material.

An eighth object of the present invention is to provide an improved masonry wall anchoring device configured to be at least irreversibly expanded or inflated by a flowable material, in particular a plastic flowable material.

A ninth object of the present invention is to provide an improved masonry wall anchoring device configured for reinforcing and stabilizing an existing brick wall, the anchoring device including an anchoring tube having a first end configured to releaseably couple with a material injection device, the anchoring tube configured to substantially fit within a hole provided in the brick wall and being provided with at least one exit port extending through a wall portion of the anchoring tube and configured for delivering material from the material injection device in one or more injection applications to one or more locations within the brick wall.

A tenth object of the present invention is to provide an improved masonry wall anchoring device, including an anchoring tube provided with at least one positioning device configured for positioning the anchoring tube within the center of the hole provided in the brick wall to ensure an even distribution of the injected material within the hole in the brick wall and around the anchoring device to ensure an evenly distributed bond between the anchor device and the wall construction elements.

An eleventh object of the present invention is to provide an improved masonry wall anchoring device including an anchoring tube provided with a positioning device configured to expand radial outwardly.

A twelfth object of the present invention is to provide an improved masonry wall anchoring device including an anchoring device provided with a plurality of positioning devices extending or expanding radial outwardly from said anchoring tube.

A thirteenth object of the present invention is to provide an improved masonry wall anchoring device including an anchoring tube provided with a positioning device having finger-like projections extending radial outwardly from the anchoring tube.

A fourteenth object of the present invention is to provide an improved masonry wall anchoring device including an anchoring tube provided with a positioning device having a ring-like projection extending radial outwardly from the anchoring tube.

A fifteenth object of the present invention is to provide an improved masonry wall anchoring device including an anchoring tube provided with a plurality of exit ports.

A sixteenth object of the present invention is to provide an improved masonry wall anchoring device including an anchoring tube provided with a plurality of exit ports located at different positions along a length of the anchoring tube.

A seventeenth object of the present invention is to provide an improved masonry wall anchoring device including an anchoring tube provided with a plurality of exit ports located at a single position along a length of the anchoring tube at different radial positions.

An eighteenth object of the present invention is to provide an improved masonry wall anchoring device including an anchoring tube provided with a plurality of exit ports located both at different positions along a length of the anchoring tube and at different radial positions at particular different positions along a length of the anchoring tube.

A nineteenth object of the present invention is to provide an improved masonry wall anchoring device including an anchoring tube provided with a plurality of exit ports located in two or more sets of exit ports at different positions along a length of the anchoring tube.

A twentieth object of the present invention is to provide an improved masonry wall anchoring device including an anchoring tube provided with at least one expandable wall portion configured to expand radial outwardly from the anchoring tube when the anchoring tube is being injected or filled with material under pressure.

A twenty-first object of the present invention is to provide an improved plastic masonry wall anchoring device including an anchoring tube provided with at least one expandable wall portion configured to expand radial outwardly from the anchoring tube when the anchoring tube is being injected or filled with material under pressure.

A twenty-second object of the present invention is to provide an improved masonry wall anchoring device including an anchoring tube provided with an attachment device configured for connecting the anchoring tube to interior framing of a building.

A twenty-third object of the present invention is to provide an improved masonry wall anchoring device including an anchoring tube provided with an attachment device having an extension configured to fit through a hole drilled through the framing and configured to be secured with a threaded fastener.

A twenty-fourth object of the present invention is to provide an improved masonry wall anchoring device including an anchoring tube provided with a closed penetrating end.

A twenty-fifth object of the present invention is to provide an improved masonry wall anchoring device configured for stabilizing a brick wall, the anchoring device including an anchoring tube having a first end configured to releaseably couple with a material injection device, the anchoring tube configured to substantially fit within a hole provided in the brick wall and being provided with at least one expandable wall portion configured for expanding radial outwardly.

A twenty-sixth object of the present invention is to provide an improved masonry wall anchoring device configured for stabilizing a brick wall, the anchoring device including an anchoring tube having a first end configured to releaseably couple with a material injection device, the anchoring tube configured to substantially fit within a hole provided in the brick wall and being provided with at least one expandable wall portion configured for expanding radial outwardly, the anchoring tube provided with at least one exit port extending through a wall portion of the anchoring tube and configured for delivering material from the material filling injection device to one or more locations within the brick wall external to the anchoring device.

A twenty-seventh object of the present invention is to provide an improved system and/or method of reinforcing a brick wall, including the steps of making a hole in an existing brick wall; inserting a plastic anchoring tube into said hole in the brick wall; injecting melted plastic material into said plastic anchoring tube to expand a portion of said anchoring tube.

The present invention is directed to an improved masonry wall anchoring device, system, and method thereof.

The anchoring device according to the present invention is preferably configured for connecting or tying an outer brick wall to an inner brick wall, or otherwise reinforcing the combined brick wall structure. The anchoring device according to the present invention can be used during construction of a new wall, or immediately after construction of a new wall, for example, for providing a reinforced combined brick wall structure for added structural strength, to increase the life of the combined brick wall structure and/or in an attempt to make the building earthquake proof or more resistant to damage or failure during an earthquake. The anchoring device according to the present invention is particular suitable for use during renovation of an existing wall, in particular a deteriorated brick wall structure.

The brick wall structure to be reinforced by the anchoring device according to the present invention can be a single brick veneer wall, or a combined brick wall structure having an outer brick wall connected to an inner brick wall. In a preferred embodiment, the anchoring device according to the present invention can also structurally connect a brick wall or walls to other building structures, in particular to interior or exterior lumber or steel framing of the building.

A preferred embodiment of the anchoring device according to the present invention is one made at least partially of plastic material, and more preferably made entirely of plastic material. The plastic material significantly reduces the cost of material and costs associated with the manufacturing and production of the anchoring device according to the present invention. Further, the plastic material is softer and more forgiving than a metal anchor, has increased elongation and flexibility properties, and will not damage cement and/or brick material surrounding the hole provided in the brick wall for installation of the anchoring device according to the present invention.

In a more preferred embodiment of the anchoring device according to the present invention, the anchoring device is configured to be at least partially filled with a flowable material, in particular cement, adhesive, epoxy and/or plastic material, in particular hot or melted plastic material. Preferably, the filling material is selected to be of a type that will harden after being injected into the anchoring device. The filling material can be used to reinforce the tensile, shear and/or compressive strength of the anchoring device, and/or to expand or inflate the anchoring device within the installation hole. In a preferred embodiment, the filling material both increases the strength of the anchoring device when hardened or cured, and also expands the anchoring device within the installation hole. The anchoring device can be expanded within the installation hole by being filled under pressure. More specifically, the walls of the anchoring device can expand radial outwardly due to the significant increase of pressure as the filling material is being injected into the anchoring device. Alternatively, or in addition, the filling material can flow through one or more internal passageways provided within the device to one or more exit ports causing the filling material to exit the anchoring device and expand at or around the anchoring device. In this manner, the anchoring device is expanded in the sense that the filling material is still connected to the anchoring device and the filling material outside the anchoring device increases the overall dimension of the anchoring device.

In a preferred embodiment of the anchoring device according to the present invention, the anchoring device is configured to expand substantially only in a radial direction. This prevents the anchoring device from being pushed out of the installation hole as the anchoring device is being filled. For example, an outer wall of the anchoring device at or around a middle portion of the anchoring device is configured to be structurally weaker, for example, by thinning the middle wall portion, by providing one or more lines of weakness in the middle wall portion and/or reinforcing the end portions of the anchoring device. In this manner, the middle wall portion expands only or more quickly relative to the end portions thereof causing the middle wall portion to anchor initially with the installation hole preventing the anchoring device from being pushed out or expelled from the installation hole as the anchoring device is further filled.

In another preferred embodiment, the anchoring device according to the present invention is configured to begin to anchor into the installation hole even upon insertion into the installation hole, and prior to filling the anchoring device. In this manner, again the anchoring device resists being expelled or being pushed out of the installation hole upon being filled. At the same time, the anchoring device resists being displaced from a central location within the concentricity of the bored hole ensuring that the injected material is evenly distributed around the anchoring device resulting in a uniform cross section of injected material and a resultant uniform bond in all directions between the anchoring device and the wall elements. For example, the anchoring device is provided with fingers, ridges, projections, protrusions or other anchoring structure, which contacts with one or more inner surfaces of the installation hole as the anchoring device is being inserted into the installation hole. Further, the anchoring structure can be configured to increase its anchoring strength to resist being pushed out or expelled from the installation hole as the anchoring device is being filled to compensate for the increasing build up of pressure within the installation hole.

Preferably, the anchoring device according to the present invention is configured to structurally connect an outer brick wall to an inner brick wall of a combined brick wall structure, in particular an existing brick wall structure. To achieve this goal, an installation hole is drilled into the outer brick wall, through the space, fill material, rubble or cement between the brick walls, and then into the inner brick wall, preferably using a conventional hammer drill provided with an appropriate size masonry drill bit. The installation hole is preferably drilled into the mortar joint at the intersection of the mortar joints between two (2) side-by-side bricks called a head joint, and the joint between horizontal rows of bricks, called the bed joint, in the outer brick wall.

Preferably, the anchoring device according to the present invention securely anchors within the installation hole at or adjacent the locations of the outer brick wall and inner brick wall. More, specifically, the anchoring device is preferably configured to expand at or adjacent to the end portions thereof within the installation hole at least at these two (2) particular locations mechanically connecting the anchoring device to the outer brick wall and inner brick wall. Further, preferably the anchoring device also expands in a middle portion thereof, causing the anchoring device to be locked between the outer brick wall and inner brick wall. Further, the anchoring device according to the present invention can be configured with one or more passageways or ports to allow filling material to exit at or adjacent the middle portion of the anchoring device to allow the filling material to exit the anchoring device and fill in between the outer brick wall and inner brick wall. In this manner, the anchoring device functions as an injection nozzle for filling in specific locations (i.e. at or adjacent the location of the anchoring device) in the combined brick wall structure. The filling material can be selected to contact and bind or bond with the inner surfaces of the outer brick wall and inner brick wall causing a mechanical coupling or connection therebetween upon hardening or curing of the filling material.

The anchoring device according to the present invention can be made of various materials, including but not limited to, plastic, plastic composite, rubber, rubber composite, Kevlar, carbon fiber, boron composite, fiberglass, metal, metal components, metal composite, plastic/metal composite, phenolic, paper, and paper composite. Preferably, the anchoring device according the present invention is made from one or more plastic polymers or mixtures thereof with or without additives that can be injection molded, extruded, blow molded, vacuum formed, or shaped or formed by other means such as laser solidification or woven or knit into a suitable configuration for use according to the present invention. The base plastic material is preferably polyethylene, polypropylene, a mixture of polyethylene and polypropylene, poly vinyl chloride (PVC), polyethylene terephalylate (PET), or other suitable plastic or synthetic resins. These types of plastic materials are particular suitable for use in manufacturing the anchoring device(s) according to the present invention, since they are economical to make, prevent damage to the brick walls during installation, in particular when being expanded within the installation hole, and having suitable structural strength for reinforcing a brick wall or combined brick wall structure.

The anchoring devices according to the present invention are configured to be expanded when filled and/or function as an injection nozzle for the filling material within the combined brick wall structure. Thus, the anchoring device according to the present invention includes one or more passageways, compartments, reservoirs, receivers, or other void(s) located therein for receiving the filling material. A particular suitable configuration of the anchoring device according to the present invention is an anchoring tube or elongated structure having a shape and size suitable to be received within an installation hole (e.g. made by drilling) and having a length extending from the outer brick wall to the inner brick wall of a combined brick wall structure. Preferably, one end of the anchoring tube is open or otherwise configured for being releaseably connected to filling equipment (e.g. filling tube or nozzle), and an opposite end of the anchoring tube is closed to prevent filling material from exiting the opposite end when being filled. For example, the end of the anchoring tube initially inserted into an installation hole is the closed end of the anchoring tube. When such an anchoring tube is fully inserted into the installation hole, the open end of the anchoring tube is still accessible to allow filling thereof by external filling equipment (e.g. filling tube or nozzle). Preferably, the open end is located beneath the outer surface of the grout so that replacement grout can be used to cover and seal the open end of the anchoring tube after being filled to cosmetically restore the exposed surface of the brick wall.

The filling material is preferably a flowable material that can be pumped or otherwise injected under pressure into the anchoring tube. The filling material can be a fluid designed to expand or inflate the anchoring tube within the installation hole. For example, the flow material can be air, water, or some type of fluid that can be pumped in under pressure and permanently expand and deform the anchoring tube. The fluid can be released or removed (e.g. by suction) after the expansion of the anchoring tube. Preferably, the filling material is a material that is flowable and then laters hardens or cures, and remains within the anchoring tube. For example, hot or melted plastic resin, cement, epoxy, or adhesive can be pumped under pressure into the installed anchoring tube to expand same, and then left to harden or cure. Most preferably, the filling material increases the structural strength of the anchoring tube, or in embodiments of the anchoring tube having one or more exit ports it can fill in between the outer brick wall and inner brick wall, and structurally bond or bind with inner surfaces of the outer brick wall and inner brick wall to structurally secure and stabilize the combined brick wall structure.

The filling apparatus for use with the anchoring device, in particular the anchoring tube according to the present invention can vary depending on the filling material and/or applications. For cement filling material, the apparatus can include a hopper for receiving premixed cement or a cement mixer for mixing dry cement with water for making cement. A powered mechanical pump designed and configured for pumping the cement under pressure from the hopper or mixer along a conduit to an injector or nozzle can be utilized for supplying the flowable cement under pressure into the anchoring tube. For epoxy filling material, a hand pump apparatus for mixing and injecting the epoxy can be utilized for supplying flowable epoxy under pressure into the anchoring tube. For hot plastic filling material, the material handling equipment can include a hopper for receiving plastic resin pellets and a plastic extruder or injection apparatus for mixing and/or melting the plastic, and supplying the melted plastic resin under pressure to the anchoring tube. Preferably, the plastic pellets utilize plastic material(s) such as regrind or recycled plastic to further reduce the overall costs related to the use of the anchoring device.

The anchoring device according to the present invention can be utilized for reinforcing a wall structure, in particular a masonry wall made of brick. For brick walls having an outer brick walled spaced apart from an inner brick wall, the anchoring device according to the present invention can mechanically connect the outer brick wall to the inner brick wall at one or more locations. Further, in some embodiments, the anchoring device is configured to also mechanical connect or tie into other building structures such as an existing or auxiliary added internal or external lumber and/or steel framing system of the building. Additionally, in some embodiments the anchoring device of the present invention can engage in a favorable manner other auxiliary strengthening devices such as embedded wires, cables, meshes or rods that when combined with the anchoring device of the present invention, to provide an enhanced application and an improved performance of these auxiliary devices. In other applications of the anchoring device according to the present invention, a brick veneer wall can be reinforced by drilling and installing one or more anchoring devices for mechanically connecting or tying the brick veneer wall to existing or additionally added building structure such as an interior or exterior lumber and/or steel framing of the building. Even further, the anchoring device(s) according to the present invention can be installed between adjacent bricks during construction of a new brick wall, and then later filled to enhance reinforcement thereof.

The anchoring system according to the present invention utilizes a plurality of anchoring devices according to the present invention on a particular wall or wall portion to be reinforced. For example, a new brick wall or old existing brick wall is reinforced by making a number of holes (e.g. by drilling) into the brick wall. The holes are made in a particular pattern or arrangement (e.g. rows, columns, matrix, grid) to provide, for example, uniform distribution and reinforcement on a unit area basis, or increasing reinforcement (e.g. a heavy concentration of anchoring on lower portions or corners of the brick wall where forces are concentrated). Then, the holes are fitted with one or more different types of anchoring devices according to the present invention, and then filled with one or more types of injected materials creating one or more patterns of bonding or expansion to cause anchoring thereof.

The anchoring method according to the present invention involves making one or more holes into a wall to be reinforced, inserting an anchoring device according to the present invention into the hole, and then filling the anchoring device to activate the anchoring device. Preferably, the anchoring device is filled with a filling material to an extent to 1) expand the anchoring device; and/or 2) cause the filling material to exit out of the anchoring device and secure (e.g. cement or adhere) the outer wall layer to an inner wall layer, in particular an outer brick wall to an inner brick wall. In a preferred method, a plastic anchoring tube according to the present invention is injected with hot melted plastic resin under pressure causing the anchoring tube to expand and/or hot melt plastic resin to be injected through the anchoring device into a space between adjacent walls and around the anchoring tube.

BRIEF DESCRIPTION OF THE DRAWINGS

FIGS. 12-A, 12-B, 12-C, 12-D and 12-E are various perspective views of different embodiments of the anchoring device according to the present invention having different exit hole shapes, sizes, patterns and/or spacing.

FIG. 13 is a perspective view of another embodiment of the anchoring device according to the present invention having different types, patterns and/or spacings, sizes and/or shapes of protrusions.

FIG. 14 is a perspective view of a separable attachable positioning ring-like element that has both interior and exterior positioning means that can be attached to or slide over the exterior of the anchoring device according to the present invention either in a single instance or in multiple instances along the length of the device.

FIG. 29 is a perspective view of a snap fit end cap for an anchoring device according to the present invention, and configured to prevent outflow of injected filling material from the anchoring device.

FIG. 30 is a reversed perspective view of the end cap shown in FIG. 29.

FIG. 31 is a perspective view of a snap fit end cap configured to be inserted into a filled anchoring device according to the present invention to close off the passageway therethrough and prevent the escape or outflow of the injected filling material.

FIG. 32-A is a perspective view of an open ended snap fit cap configured to be inserted into the open end of the anchoring device according to the present invention and configured to allow for the engagement of auxiliary reinforcing means.

FIG. 32-B is a perspective views of another open ended snap fit cap configured to be inserted into the open end of the anchoring device according to the present invention and configured to allow for an alternate means of engaging auxiliary reinforcing means.

FIG. 33 shows a detailed broken-away longitudinal perspective view of a closed end snap fit cap configured to cooperate with a modified open end of an anchoring device according to the present invention.

FIG. 34 is a detailed broken away view of an opposite end of the anchoring device shown in FIG. 21 showing the connecting end thereof.

FIG. 35-A is a perspective view of an exterior slip over spacer collar provided with incremental length markings and configured to cooperate with the connecting end of an anchoring device according to the present invention.

FIG. 35B is a perspective view of another version of a slip over spacer collar provided with incremental length markings having an enlarged bearing flange and configured to cooperate with the connecting end of an anchoring device according to the present invention.

FIG. 43-A is a detailed broken away side cross-sectional elevational view of the combined anchoring device and thin membrane encapsulation sleeve in an unfilled mode.

FIG. 43-B is a detailed broken away side cross-sectional elevational view of the combined anchoring device and thin membrane encapsulation sleeve in a partially filled mode.

FIG. 43-C is a detailed broken away side cross-sectional elevational view of the combined anchoring device and thin membrane encapsulation sleeve in a fully filled mode.

DETAILED DESCRIPTION OF PREFERRED EMBODIMENTS

Figure 1:
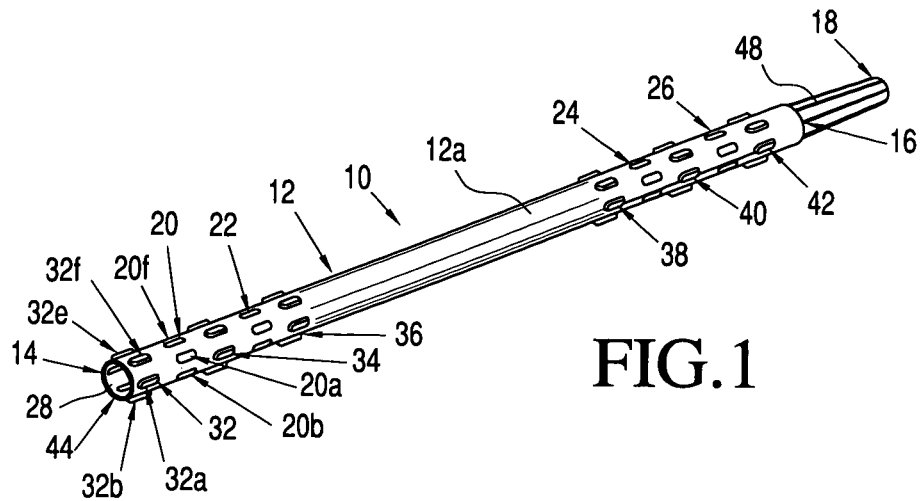
FIG. 1 is a perspective view of an embodiment of the anchoring device according to the present invention.

The present invention is directed to an anchoring device for strengthening, reinforcing, fixing and/or repairing masonry structures, in particular a masonry interior and exterior partition and load bearing walls. The anchoring device according to the present invention is particularly suitable for use with a single brick wall layer, or a combined brick wall structure having two (2) or more spaced apart brick wall layers. The anchoring device according to the present invention can be provided with an optional connecting end configured to connect with other structural elements or components of the building, in particular an internal or external wall structure of the building (e.g. wall sheathing, wall studs, band board, steel frame, etc.)

The anchoring device according to the present invention can be made from a wide variety of materials such as plastic, rubber, synthetic rubber, fiberglass, resin, plastic composite, metal, metal composite, ceramic, ceramic composite, phenolic, paper and paper composite. The anchoring device according to the present invention is preferably a molded or formed plastic or polymer material to reduce the cost of manufacturing, having suitable structural strength, and other complimentary material properties such as flexibility, elongation, and chemical inertness to reduce the damage to the masonry structure during installation and after installation.

The anchoring device is preferably produced by "molding", which can be a one (1) step process or multiple step process. Further, a single method of molding can be utilized, or a combination of different methods of molding can be utilized for manufacturing the anchoring device according to the present invention. The molding methods include injection molding (both high pressure and low pressure types), expanded or foaming methods, co-injection, reaction method, blow or expansion molding, rotational or inertial molding, laser solidification, sheet forming including both thermal, vacuum and/or pressure molding, or combinations thereof, assisted sheet forming, and extrusion processes, either in a single step or in a series of sequential steps.

Further, the plastic material, which is generally referred to as a "polymer", refers to a single polymer or multiple constituent polymer blend(s), or the combination of unblended polymers, which may or may not include additional additives, fillers or co-reactants that affect melting temperature, filling pressure, filling volume, injection or molding pressure, density, internal structure, surface structure, yield strength, stiffness or rigidity, elongation distortion, flexibility, shrinkage, warping, dimensional stability, coloration and other readily modifiable polymer material characteristics.

Additionally, the plastic polymer molding processes referred to above are readily and easily extended to include similar manufacturing methods such as powdered, sintered, or liquid injected metal shaping or molding methods wherein a powdered, granular, liquid or similar pre-processed metal or combinations of metals allow their use in fabrication methods similar to those of plastic polymer materials. Further, "composite" fabrication methods wherein a polymer, glass, resin or other binding element is combined with or impregnated into a woven, knitted or formed multi-filament or stranded material to create a final "composite" product is applicable for use in making an anchoring device according to the present invention. Finally, metal forming methods such as molding, stamping, extruding, forging, machining, cutting, electrical discharge manufacturing (EDM), water forming, explosive forming, pressure forming, gas pressure forming, and other similar methods can be used to manufacture metal anchoring devices according to the present invention.

Figure 2:
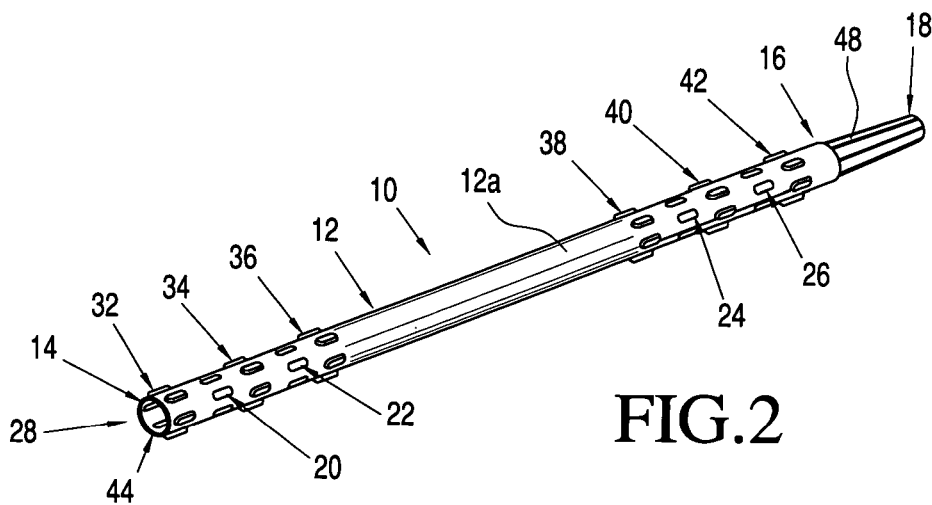
FIG. 2 is a perspective view of the anchoring device shown in FIG. 1.
Figure 3:
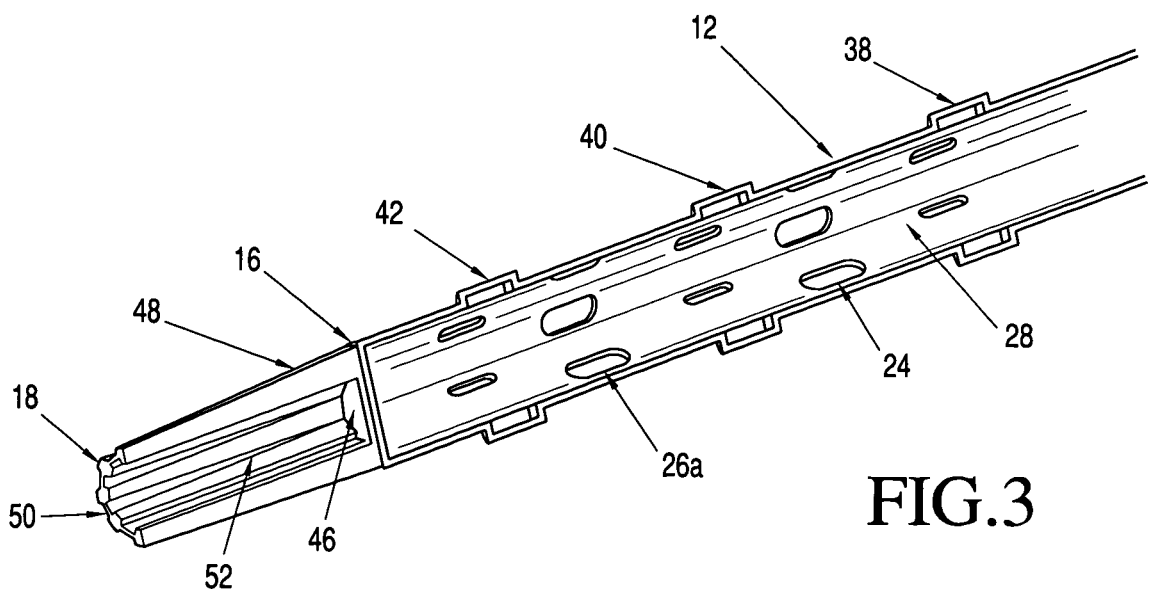
FIG. 3 is a detailed broken away longitudinal cross-sectional perspective view of the connector end of the anchoring device shown in FIG. 1 or 3.

An anchoring device 10 according to the present invention is shown in FIGS. 1-3. The anchoring device 10 can be considered as an anchoring tube, which is configured for connecting or tying brick wall layers together including an outer brick wall layer to an inner brick wall layer or two or more layers of an interior wall of a combined brick wall structure, in particular an existing structural or non-structural (i.e. partition) brick wall structure.

The anchoring device 10 is defined by a cylindrical-shaped tubular body 12 having an open end 14 and a closed end 16. The closed end of the anchoring device 10 is provided with an optional connector end 18 configured to connect with other structural elements or components of the building, in particular wall sheathing and/or wall studs of the building or with an auxiliary framing system.

The tubular body 12 is provided with four (4) sets of exit ports 20, 22, 24, 26 spaced apart along the length of the anchoring device 10 with each set having six (6) exit ports (e.g. 20a, 20b, 20c, 20d, 20e, 20f) evenly spaced apart around the periphery of the tubular body 12 as shown. The exit ports are shown as being elongated oval-shaped exit ports. The two (2) sets of exit ports 20 and 22 are located adjacent to the open end 14 of the tubular body 12, and the two (2) sets of exit ports 24 and 26 are located adjacent to the closed end 16 of the tubular body 12. In this configuration, the two (2) sets of exit ports 20 and 22 are located so as to be positioned within the outer brick wall when the anchoring device 10 is installed into a hole in a combined brick wall structure, from the exterior surface and the two (2) sets of exit ports 24 and 26 are located so as to be positioned within the inner brick wall when the anchoring device 10 is installed into the hole in the combined brick wall. Optionally, one or more additional exit ports can be provided along the length of a middle section 12a of the tubular body 12 to allow flowable filling material to be injected and flow from the open end 14 of the anchoring device 10 through a central passageway 28 extending the length of the anchoring device 10 and exit through the optional exit port(s) into a space located between the outer brick wall and inner brick wall of a combined brick wall structure.

The number of exit ports, the number of sets of exit ports, and the location of the exit ports along the length of the anchoring device 10 can be varied from that shown depending upon different applications or specifications of the anchoring device 10. For example, the number of exit ports can range from zero (0) to over a five hundred (500) depending upon the length and circumference of the device. The number of sets of exit ports can range from zero (0) to over sixty (60). Further, the number of exit ports at a particular location along the length of the anchoring device 10 can be varied from that shown. For example, the number of exit ports at a particular location along the length of the anchoring device 10 can range from zero (0) to over thirty (30). Even further, the shape and size of the individual exit ports can be varied, and the spacing between individual exit ports (e.g. both lengthwise and peripherally) can be varied. Thus, the anchoring device 10 can be designed and tailored to a particular application depending on such variables as the type of wall to be reinforced, the manner of construction of the wall to be reinforced, brick age, brick type, brick hardness, brick dimensions, brick composition, type of joint material, physical and/or chemical properties of the joint material, the number of wall layers to be connected, the overall thickness of the wall structure, the deformation or yield mechanism desired at the exit port location and numerous other physical, chemical and engineering parameters or factors.

The anchoring device 10 is provided with six (6) sets of protrusions 32, 34, 36, 38, 40, 42 with each set having six (6) individual protrusions (e.g. 32a, 32b, 32c, 32d, 32e, 32f) equally spaced apart around the periphery of the tubular body 12. The protrusions extend radial outwardly from the outer surface of the tubular body 12.

The protrusions are shown elongated and aligned relative to the length axis of the anchoring device 10. However, the size, shape and configuration of the protrusions can be varied for different applications and/or specifications.

Referring to FIG. 2, the anchoring device 10 is provided with the passageway 28 extending through the anchoring device 10. Specifically, the passageway 28 extends from the open end 14 to the closed end 16. The open end 14 defines a receiver 44 configured for cooperating with a device or apparatus having a nozzle for injecting a filling material into the anchoring device 10. The closed end 16 of the anchoring device 10 is provided with an interior bulkhead 46 sealing off the closed end of the passageway 28.

In a preferred embodiment of the anchoring device 10 shown in FIG. 3, the connector end 18 of the anchoring device 10 is provided with a connector 48 configured to allow the anchoring device 10 to be connected to other structures of the building, in particular wall sheathing and/or wall studs or to a internal or external structural framing system. For example, the connector 48 is configured to connect with the end of a threaded bolt or fastener (not shown). The connector 48 can be internally threaded, provided with a molded-in insert having internal threads, or provided with radial inwardly extending protrusions 50 configured to cooperate and engage the threaded bolt or fastener. Specifically, the threaded bolt or fastener cuts threads (i.e. self-taps) into the protrusions 50 as the threaded bolt or fastener is threaded into the receiver 52 of the connector 48.

Figure 4:
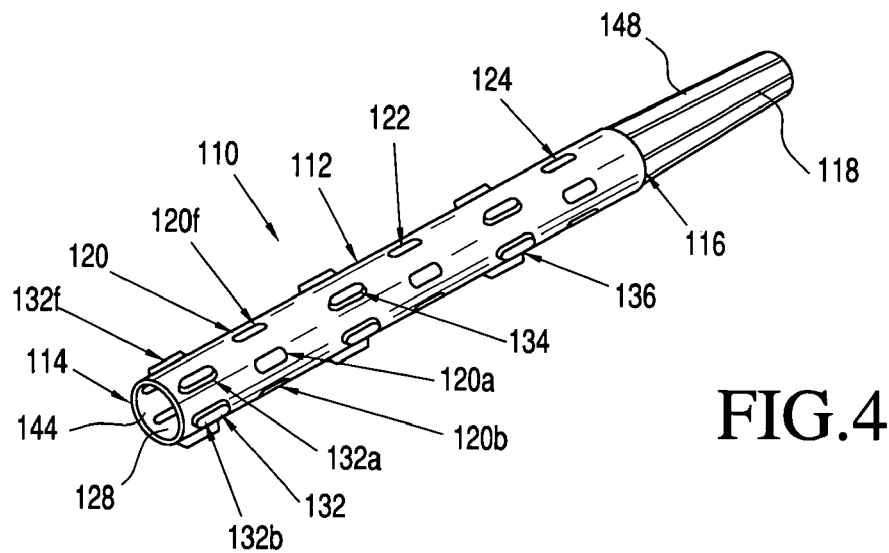
FIG. 4 is a perspective view of another embodiment of the anchoring device according to the present invention showing an anchoring device with a shorter overall length.

An anchoring device 110 according to the present invention is shown in FIG. 4. This anchoring device 110 is configured as a shorter embodiment of the anchoring tube according to the present invention, and is configured for connecting or tying a single layer brick wall or brick veneer to other components of the building such as plywood or lathe wall, studs, joists, band boards, etc.

The anchoring device 110 is defined by a cylindrical-shaped tubular body 112 having an open end 114 and a closed end 116. The closed end of the anchoring device 110 is provided with an optional connector end 118 configured to connect with other structural elements or components of the building, in particular wall sheathing and/or wall studs of the building.

The tubular body 112 is provided with three (3) sets of exit ports 120, 122 and 124 spaced apart along the length of the anchoring device 110 with each set having six (6) exit ports (e.g., 120a, 120b, 120c, 120d, 120e, 120f) evenly spaced apart around the periphery of the tubular body 112 as shown. The exit ports are shown as being elongated oval-shaped exit ports. The three (3) sets of exit ports 120, 122 and 124 are positioned so as to be located within the width of the single layer brick when installed into a hole made in the single brick wall structure.

The anchoring device 110 is provided with three (3) sets of protrusions 132, 134 and 136 with each set having six (6) individual protrusions (e.g. 132a, 132b, 132c, 132d, 132e and 132f) equally spaced apart around the periphery of the tubular body 112. The protrusions 132, 134 and 136 extend radial outwardly from the outer surface of the tubular body 112.

In a preferred embodiment of the anchoring device 110, the connector end 118 of the anchoring device 110 is provided with an connector 148 configured to allow the anchoring device 10 to be connected to other structure of the building, in particular wall sheathing and/or wall studs. For example, the connector 148 is configured to connect with the end of a threaded bolt or fastener (not shown). The connector 148 can be internally threaded, or provided with radial inwardly extending protrusions, the same or similar to that shown in FIG. 3 configured to cooperate and engage the threaded bolt or fastener. Specifically, the threaded bolt or fastener cuts threads into the protrusions, as the threaded bolt or fastener is threaded into the receiver of the connector 148.

In the two (2) embodiments shown in FIGS. 1-4, the anchoring devices 10 and 110 are based on cylindrical-shaped tubes. However, the anchoring device according to the present invention can have other tube configurations.

Figure 5:
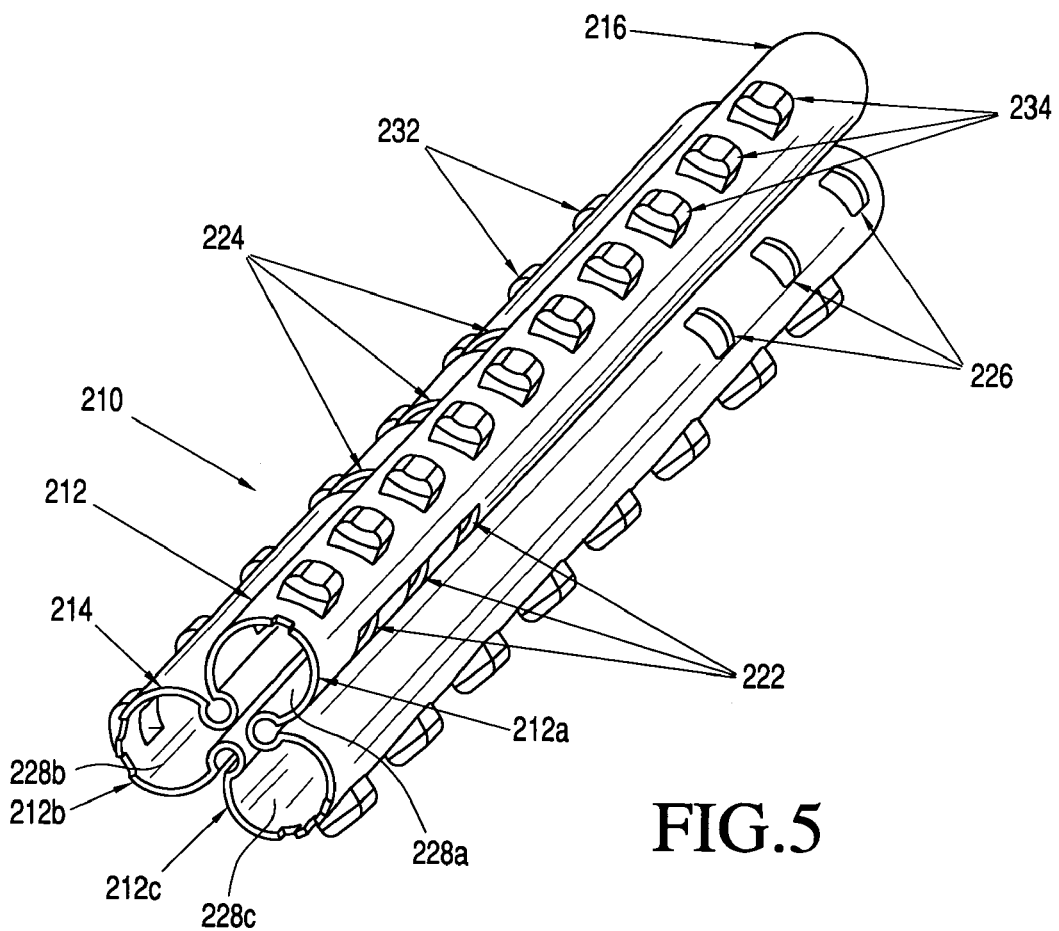
FIG. 5 is a perspective view of another embodiment of the anchoring device according to the present invention.

Another embodiment of the anchoring device 210 according to the present invention is shown in FIG. 5.

The anchoring device 210 is defined by a tubular body 212 having a cloverleaf-shaped configuration having three (3) separate and peripherally spaced apart lobes 212a, 212b and 212c defining three (3) separate flow passageways 228a, 228b and 228c. The tubular body 212 is provided with an open end 214 and a closed end 216. The number of passageways can be varied from one (1) to over twenty (20). The separate flow passageways can be of similar or difference overall lengths. Further, the passageways can be sealed from each other, or can be interconnected to allow flow of filling material therebetween.

The lobes 212a, 212b and 212c are each provided with an array of side ports 222, 224 and 226, respectively. The side ports are configured to allow for the flow of filling material into the outer voids defined by the lobes 212a, 212b and 212c when installed in a hole made in the brick wall. Further, the lobes 212a, 212b and 212c are each provided with an array of protrusions 232, 234 and 236.

INSTALLATION

Figure 6:
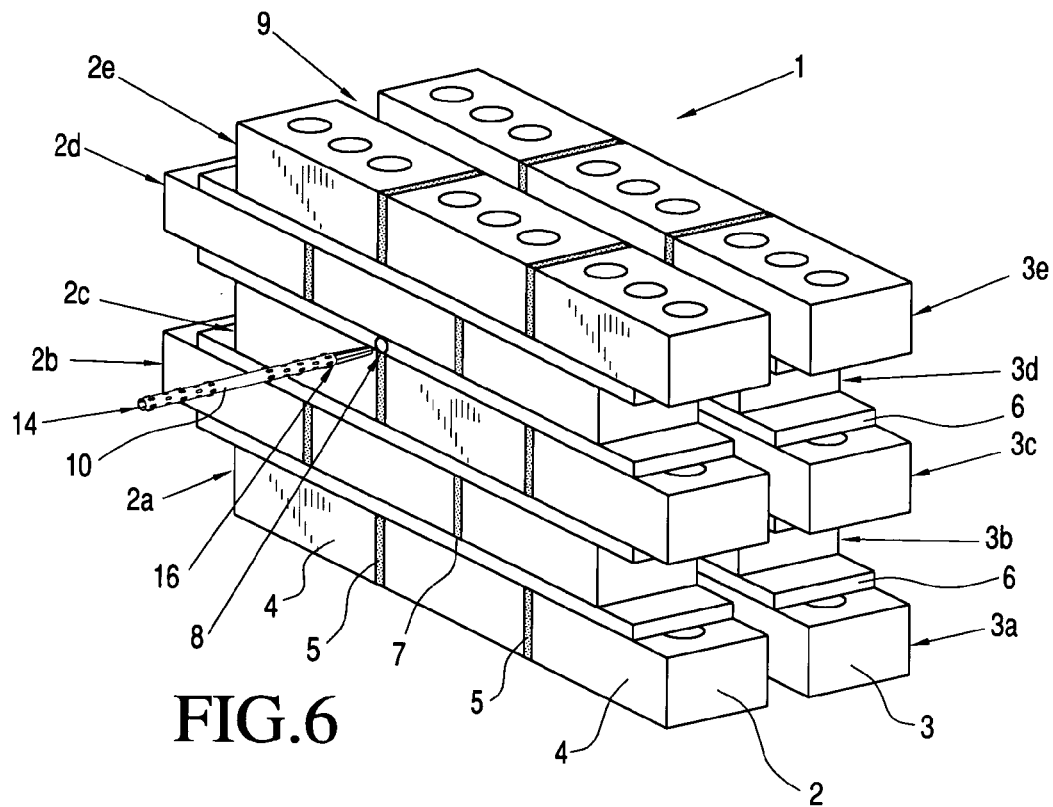
FIG. 6 is a perspective view of a section of a masonry wall made of two (2) brick wall layers including a bored hole penetrating both brick wall layers and a proximally located anchoring device shown in FIGS. 1 and 2.

The anchoring device 10 shown in FIGS. 1-3 is shown installed within a masonry wall 1 having an outer masonry wall layer 2 and an inner masonry wall layer 3, as shown in FIG. 6. It is to be understood that the depiction of two (2) masonry wall layer combined structure is for exemplary purposes only, and that the anchoring device according to the present invention is applicable to masonry wall structures having one (1), two (2), three (3), or more masonry wall layers, and to masonry walls that have multiple internal cavities instead of distinct masonry wall layers and to walls that are constructed of other similar but different materials such as rock, stone, block, tile, adobe, terra cotta, etc. It is to be further understood that the anchoring device according the present invention also functions in masonry walls having no distinct wall layering or cavity configuration. All of these alternative masonry wall types can be strengthened, reinforced and/or repaired with the anchoring device according to the present invention.

The masonry wall 1 is constructed of a plurality of masonry construction units such as blocks or bricks 4 joined together by vertical mortar "head" joints 5 and horizontal mortar "bed" joints 6, which connect at joint intersections 7. This type of construction is typically repeated in both the outer and inner wall layers 2 and 3, respectively, in a manner including a horizontal offsetting of masonry construction units to create a lowest tier 2a, a lower middle tier 2b, a middle tier 2c, an upper middle tier 2d, and a top tier 2e of the outer masonry wall layer 2 and an interior wall layer having a lowest tier 3a, a lower middle tier 3b, a middle tier 3c, an upper middle tier 3d, and an upper tier 3c of the interior masonry wall layer 3. The small section of wall shown in FIG. 6 is for exemplary purposes only. A typical wall will extend in a similar constructed pattern in length and height for many feet.

To install an anchoring device according to the present invention, a hole 8 is made in the masonry wall 1. For example, the hole 8 is cut, bored, drilled, or machined by a drill, cutting bit, cutting tip, cutting or coring saw, high pressure abrasive blasting, water blasting and/or air blasting processes. The hole 8 is preferably made through the entire thickness of the masonry walls through both the outer wall layer 2 and inner wall layer 3, and spanning the spacing 9 between the outer wall layer 2 and inner wall layer 3.

Figure 7:
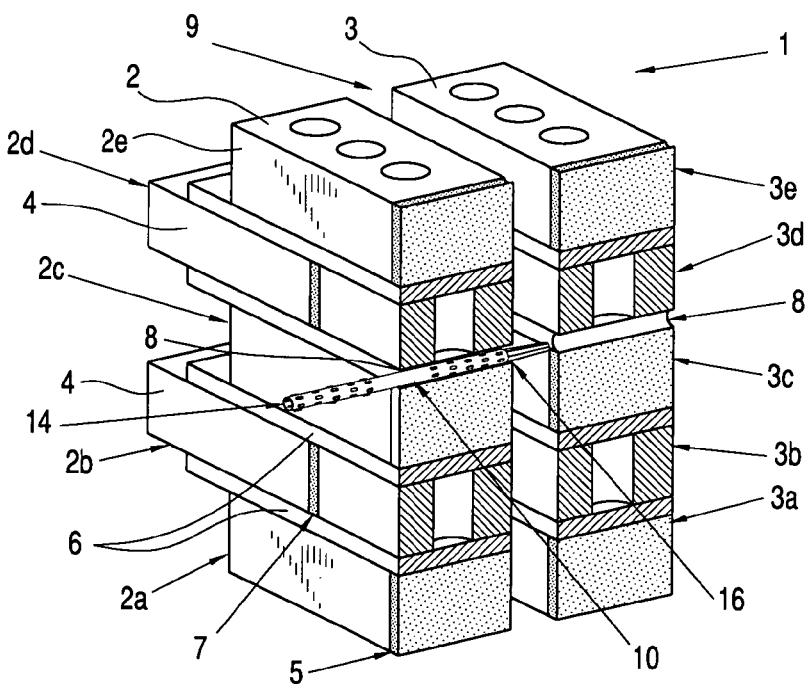
FIG. 7 is a cross-sectional perspective view of the masonry wall made of two (2) brick wall layers with the anchoring device shown in FIGS. 1 and 2 partially inserted into the two brick wall layers.

An anchoring device 10 shown in FIGS. 1-3 is being installed into the hole 8 in the masonry wall 1. The closed end 16 of the anchoring device 10 is first positioned into the hole 8, and then the anchoring device 10 is pressed into the hole 8. As shown in FIG. 7, the anchoring device 10 extends through the outer wall layer 2 and begins to enter into the hole 8 through the inner wall layer 3.

Figure 8:
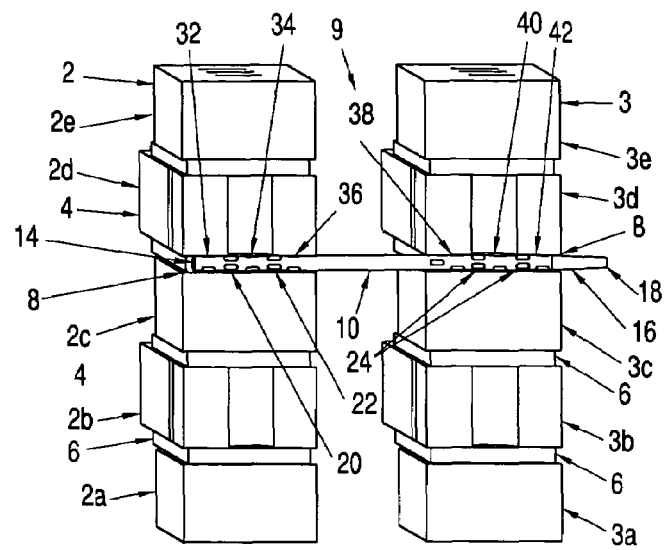
FIG. 8 is a cross-sectional end view of the masonry wall made of two (2) brick wall layers with the anchoring device shown in FIGS. 1 and 2 positioned with the connector end thereof fully inserted through both brick wall layers and commencing from a position interior to the front surface of the front brick wall layer and extending past the rear surface of the rear brick wall layer.

As shown in FIG. 8, the anchoring device 10 is fully inserted and installed within the hole 8 so that the open end 14 of the anchoring device is located below an outer surface of the outer wall layer 2. This allows the hole 8 to be later closed with a patch of cement or grout to cover and seal the hole so as to visually blend with the remaining of the joints 5 and 6. Further, the connector end 18 extends past the rear surface of the inner wall layer 3 to allow connection with other structural elements or components of the building, in particular wall sheathing and/or wall studs or an auxiliary framing system.

The anchoring device 10 is shown centered within the hole 8 along the length of the anchoring device 10 due to the sets of protrusions 32, 34, 36, 38, 40 and 42. Specifically, the protrusions 32-42 are shown in contact with the inner surfaces of the hole 8, centering the anchoring device concentrically and accurately within the hole 8.

Figure 9:
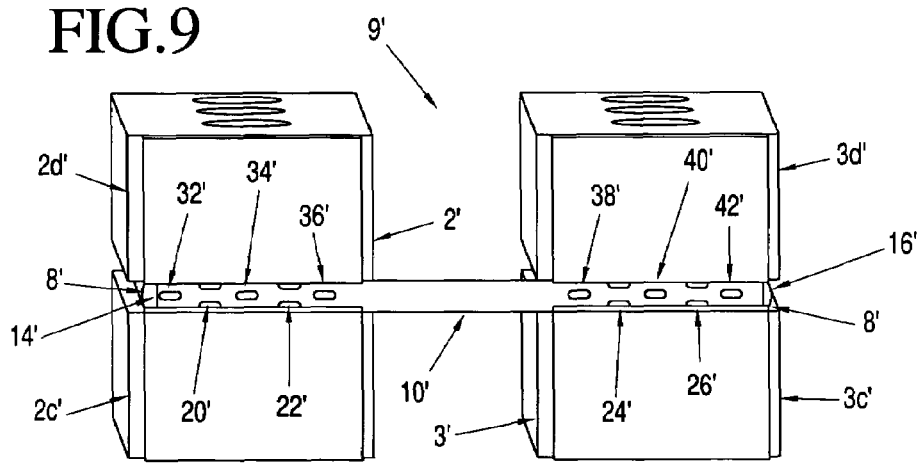
FIG. 9 is a detailed cross-sectional end view of the masonry wall made of two (2) brick wall layers with an alternatie embodiment of the anchoring device according to the present invention fully installed within the two (2) brick wall layers.

FIG. 9 shows an anchoring device 10' configured without a connecting end shown installed within a hole 8' extending through an outer wall layer 2' and an inner wall layer 3'. The open end 14' of the anchoring device 10' is shown recessed below the front surface of the outer wall layer 2' with the set of exit ports 20' and 22' positioned within the portion of the hole 8' located in the front wall layer 2' and the set of exit ports 24' and 26' located within the portion of the hole 8' located in the inner wall layer 3'. The anchoring device 10' spans across the space 9' located between the outer wall layer 2' and inner wall layer 3' with the closed end 16' extending slightly beyond the rear surface of the inner wall layer 3'. The sets of protrusions 32', 34', 36', 38', 40' and 42' are shown in contact with the inner surface of the hole 8' positioning the anchoring device 10' concentrically within the hole 8'.

Figure 10:
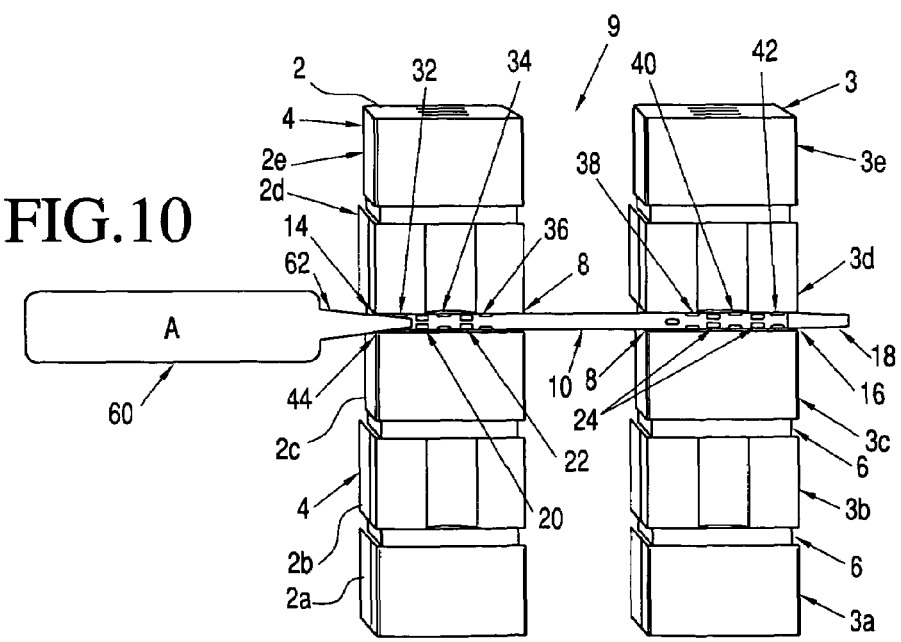
FIG. 10 is a detailed cross-sectional end view of the masonry wall made of two (2) brick wall layers with the anchoring device fully installed within the two (2) brick wall layers and releaseably connected with a device or apparatus configured for injecting a flowable and hardenable filling material into the anchoring device.

Once the anchoring device 10 is installed within the hole 8, as shown in FIG. 10, the anchoring device 10 is injected with a filling material A, preferably a flowable and hardenable filling material such as cement, glue, sealant, adhesive, foam, plastic, plastic resin, hot plastic resin, or other suitable filling material. For example, an injecting device 60 such as a material injecting gun or extruder is releaseably connected into the receiver 44 of the open end 14 of the anchoring device 10. For example, the injecting device 60 is provided with a nozzle portion 62 configured to cooperate and releaseably connect with the receiver 44 of the open end 14 of the anchoring device 10.

Figure 11:
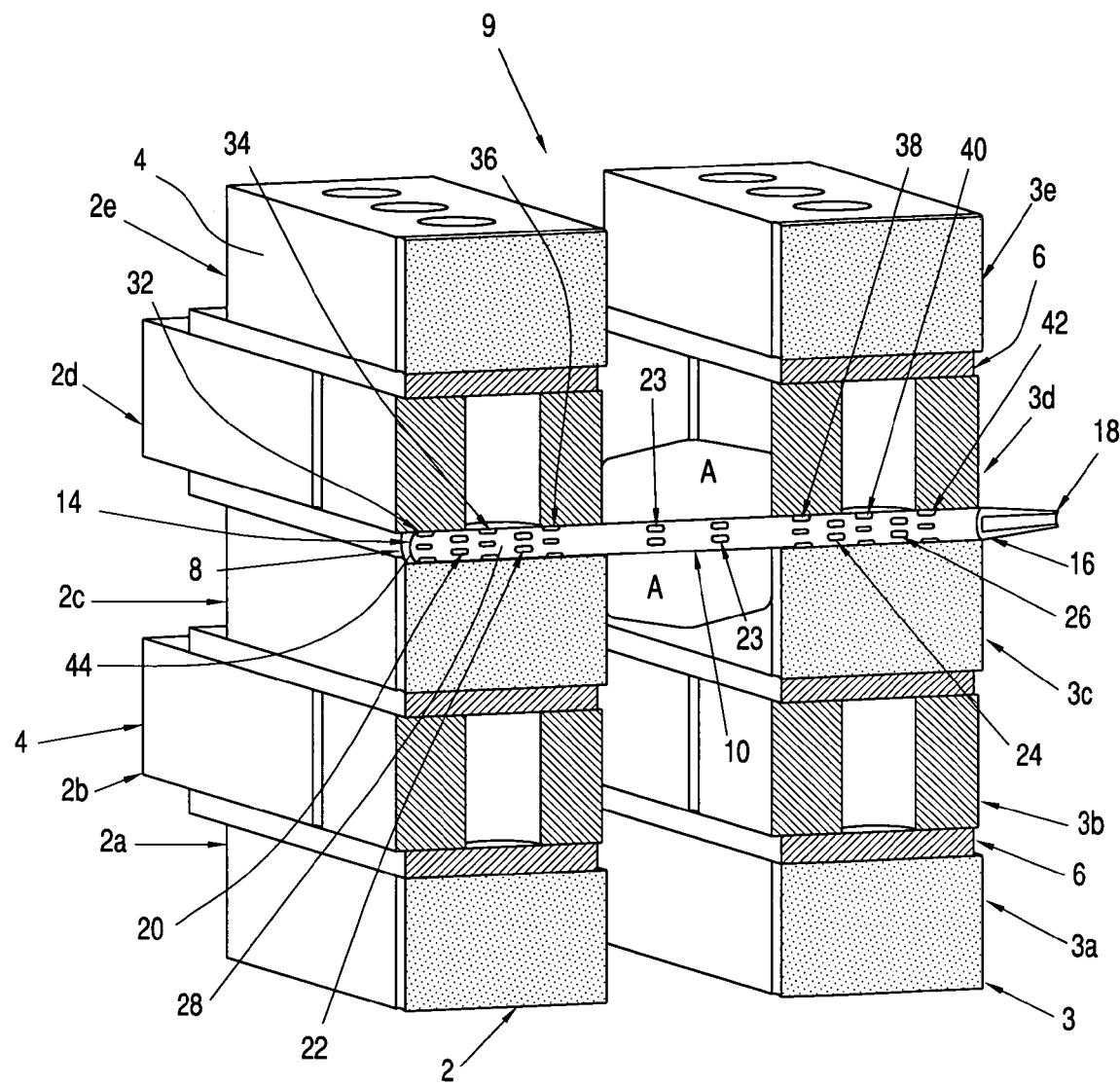
FIG. 11 is a cross-sectional perspective view of an anchoring device modified to release injected flowable and hardenable material into a void space between the two (2) brick wall layer and around the anchoring device.

The anchoring device 10 can be provide with one or more additional sets of exit ports 23, as shown in FIG. 11, somewhat centered along the length of the anchoring device 10 to allow the filling material A to fill in between the outer wall layer 2 and inner wall layer around the outside of the center portion of the anchoring device 10. In this manner, the outer wall layer 2 is structurally connected to the inner wall layer 3 due to adhesion of the filling material A to the rear surface of the outer wall layer 2, the front surface of the inner wall layer 3, and the outer surface of the anchoring device 10. More specifically, the injected filling material A flows through the flow passageway 28 and out of the sets of exit ports located along the length of anchoring device 10 creating a repeated and distributed pattern of injected filling material buttresses between the anchoring device 10 and the inner surface of the portion of the hole 8 in the outer wall layer 2, between the anchoring device 10 and the center expanded body of filling material A, and between the anchoring device 10 and the inner surface of the portion of the hole 8 in the inner wall layer 3. The expansion or swelling of the injected filling material A into cavities, cracks or broken out sections of the wall or structure can occur. The greatly increased contact area between the medial buttress and the rear surface of the front wall layer 2 and front surface of the inner wall layer 3 at the spacing between the wall layers 2 and 3 creates large areas of adhesion and engagement between the anchoring device 10 and the separate wall layers 2 and 3. This increased area of contact significantly distributes force loads passing through the wall layers and/or through the anchoring device 10 so that the specific load per unit area is greatly reduced.

ALTERNATIVE EMBODIMENTS

The anchoring device 10 shown in FIGS. 1-3 are provided with sets of elongated oval-shape exit ports 20-26. However, shapes, sizes, spacing, distribution, edge configuration and other parameters of the exit ports can be varied or changed depending on manufacturing methods and/or applications thereof. The ability to vary these and other related parameters easily and cost-effectively during the manufacturing process, such as by the use of interchangeable inserts within a molding tool, is a unique feature of the present invention that allows a high degree of customization in production to handle standard or specialized applications. Further, the percentage of total exterior area devoted to injected material exit port openings relative to the total exterior surface area available is highly variable and directly related to the ability of the anchoring device to act and contribute in a favorable manner and in combination with a wide range of injectable, flowable and hardenable materials having unique and differing characteristics such as, but not limited to, expansion, grain structure, specific surface strength, and other distinct variations.

The anchoring device 310 shown in FIG. 12-A is provided with an array of evenly spaced round shaped exit ports 320. The anchoring device 410 shown in FIG. 12-B shows an array of rectangular shaped exit ports 420 arranged in three (3) sets of two (2) circumferential rings spaced apart as indicated. The anchoring device 510 shown in FIG. 12-C shows triangular shaped exit ports 520 evenly spaced circumferentially and positioned in four (4) spaced apart sets along the length of the anchoring device 510. The anchoring device 610 shown in FIG. 12-D shows custom shaped exit ports 620 each having a smaller round end connected to a larger round end. The anchoring device 710 shown in FIG. 12-E shows custom shaped exit ports 720 having two round sections connected by a rectangular section or otherwise dumbell-shaped.

The orientation of the exit ports relative to the central longitudinal axis of the anchoring device, the orientation of the exit port edges relative to the internal or external surface of the anchoring device, the distribution of exit ports along the length of the anchoring device, and the proximate location of one (1) set of exit ports relative to another has a wide range of variations each of which can contribute unique performance features during operation thereof.

The anchoring device 10 shown in FIGS. 1-3 are provided with elongated-shaped protrusions configured to self-position or self-center the anchoring device 10 within an installation hole. These protrusion features can be fabricated with molded methods to be exterior surface features only, exterior features in communication with interior features, or active features that are capable of localized movement. The spacing of each feature one to another, the orientation of each feature or array of features relative to the geometric features of the anchoring device, the spacing of the features one array to another will provide other functions in addition to concentrically positioning the anchoring device 10 within the installation hole.

As shown in FIG. 13, the anchoring device 810 can be provided with a variety of different types of positioners. For example, a continuous circumferential positioner 870 configured to function as an anti-flow barrier to limit the flow or the escape of the injected filling material can be provided. Alternatively, or in addition to, the anchoring device 810 can be provided with expanded point conical positioners 872, which can provide the additional function of retaining and positioning an external sleeve or membrane while also contributing to both internal and external embedment and engagement with the injected filling material. The larger, rounded, blunt conical positioners 874 can also contribute to multiple embedment points, both interiorly and exteriorly, to improve the engagement of and load transmission through the injected flowable filling material, especially when fabricated as thin walled parts such as in plastic polymer formed by injection molding, blow molding or sheet/vacuum forming processes. Alternative configurations including a generally roughened or textured interior and/or exterior surfaces, existing separately along the anchor device body or existing in conjunction with one or more of the positioners devices herein describe, can also create this multiplicity of interior and/or exterior engagement points to allow this same enhanced engagement of and load transmission between the anchoring device wall surfaces and the injected material. The pointed shaped protrusions 876 can offer positioning along with flexible engagement with the interior of the bored hole that allows ease of insertion into the bore hole, but which resists any ejection force attempting to displace the anchoring device outwardly in an axial direction. The longitudinally rotated, rounded, rectangular positioners 878 also contribute a turbulent flow action to the flowable injected filling material to promote even distribution, promote additional constituent mixing where multiple part injected materials are used and minimize the creation of any aligned or nearly aligned patch edge contact boundaries that might align in an unfavorable orientation or at an unfavorable location relative to the overall load pathways through the injected filling material and/or anchoring device while at the same time creating a strong and repeated pattern of engagement between the anchoring device and the injected filling material. This repeated pattern of engagement creates a strong bonding between the anchoring device and the injected material even in the event of incomplete encapsulation of the anchoring device along its length or around its circumference by the injected material. The directionally angled positioners 880 are shaped to allow easy insertion of the anchoring device within the hole, but configured to engage the hole interior surface in a increasingly resistant engagement manner when exposed to ejection-like forces generated by the passage of injected filling material over the anchoring device from the pressure of the injected material acting on the body surfaces of the anchoring device or by pressure differentials occurring during the injection of the filling material, its expansion or its hardening reaction. The highly angulated barb positioners 882 create a compliant engagement during insertion of the anchoring device while creating an engagement highly resistive to any expulsion forces acting on the anchoring device.

FIG. 14 shows a separate ring-shaped device 84 provided with external concentric positioners 86 and internal positioners 88 that can be assembled onto the anchoring device to perform a concentric positioning function. The cross-sectional area of the ring-shaped device 84 can also act as a flow limiter or an anti-flow device as previously described herein with the flexibility to be positioned at any point on the anchoring device where in-situ conditions might beneficially dictate. Singular or multiple placements of device 84 on the anchor device allow additional flexibility in meeting variations in site requirements or engineering performance requirements.

Figure 15:
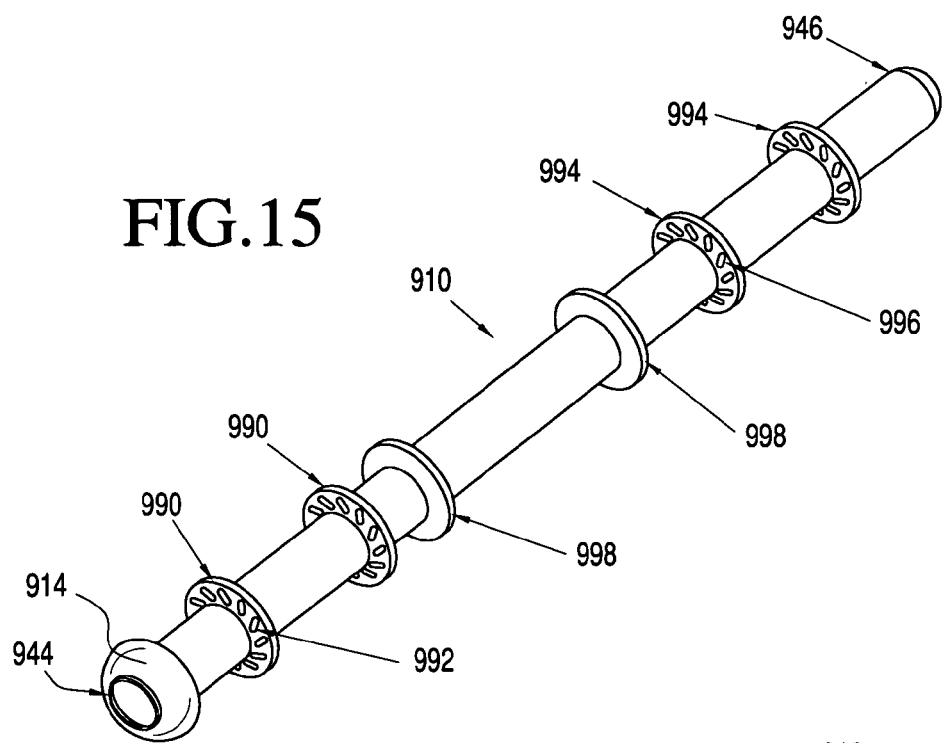
FIG. 15 is a perspective view of another embodiment of the anchoring device according to the present invention.
Figure 16:
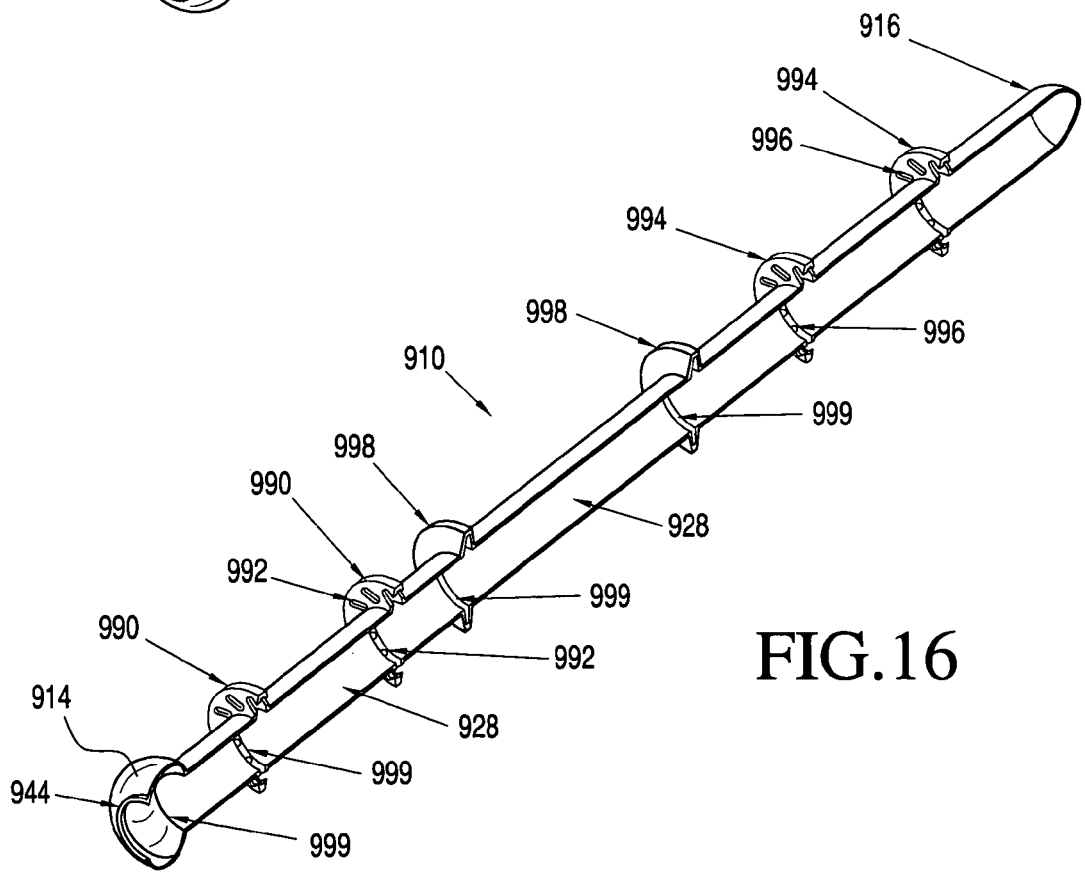
FIG. 16 is a longitudinal cross-sectional perspective view of the embodiment of the anchoring device shown in FIG. 15.

FIGS. 15 and 16 show a thin walled anchoring device 910 provide with a closed interior-most end 916, an enlarged exterior-most end 914 that also functions as a concentric positioner and anti-flow device, and a injected filling material receiver 944. This figure also shows a continuous ring-shaped front located concentric positioners 990 provided with integral exit ports 992 located on the front and back surfaces of the positioner rings 990, and rear located concentric positioner rings 994 with integral exit ports 996 located on the front and back surfaces of the positioner rings 994. Also shown are mid section concentric positioning devices 998 that also function as anti-flow limiters preventing the outflow of injected filling material from the front and rear of the hole into the spacing between wall layers. It will be readily apparent to the skilled reader that the ability to locate exit ports only on the front, only on the back or in some desired combination of selected front and back surfaces of the concentric positioning rings allows additional variability in the configuration of the instant invention that may be desirable in specific applications or solutions.

As shown in FIG. 16, the thin walled anchoring device 910 is provided with a single flow passageway 928 provided with embedment or engagement features 999 spaced along the length of the anchoring device 910. Also shown are exit ports 992 and 996 provided integral with concentric positioners and located on the front and back surfaces of the positioners 990 and 994, respectively.

Figure 17:
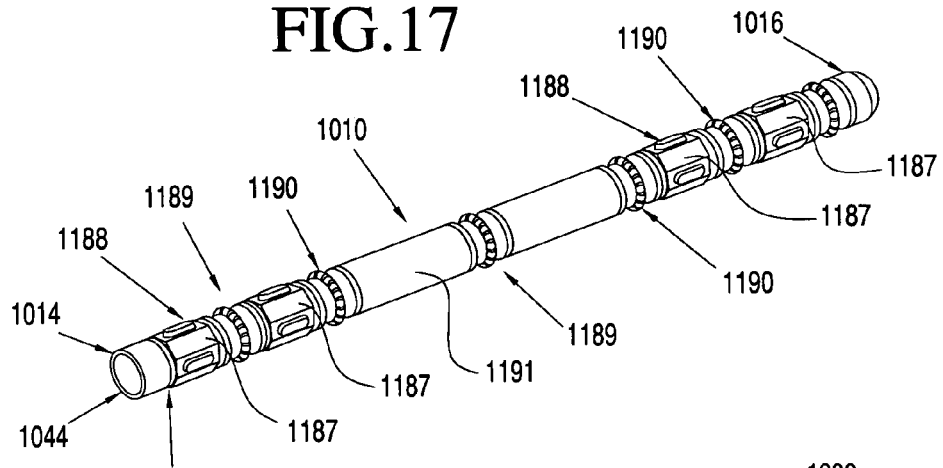
FIG. 17 is a perspective view of another anchoring device according to the present invention.

Another embodiment of the anchoring device 1010 according to the present invention is shown in FIG. 17. The anchoring device 1010 can be fabricated as a single piece or assembled from a multiplicity of individual sections either in the manufacturing facility or in a "field" environment. The anchoring device 1010 includes an open end 1014 having a receiver 1044, transition sections 1186, injected material exit port sections 1187 containing injected material exit ports 1188 followed by or connected to exterior and interior embedment features 1189 followed by or connected to concentric positioning means 1190 and separated by spacing sections 1191, and including or connected to a closed interior-most end 1016. It will be readily apparent to one skilled in the art that many alternating and/or different configurations utilizing the same or similar sections joined or interconnected in the same, similar or alternate orders can be configured. Also it will be readily apparent that individual sections could be assembled into a single device or that sections having individual functions can be molded into a single device and that the order, arrangement and orientation of one section relative to another can be varied or modified.

Figure 18:
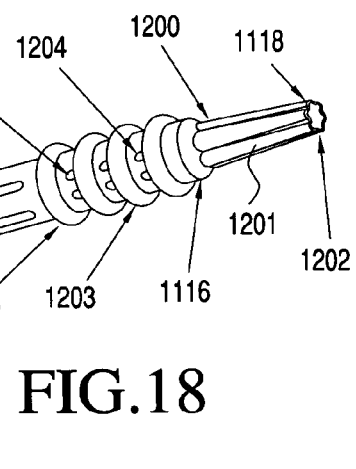
FIG. 18 is a perspective view of another anchoring device according to the present invention.

FIG. 18 shows a rotated perspective view of an alternate configuration of an anchoring device 1110 according to the present invention wherein concentric positioners 1196 and 1203 are located proximal to the exterior-most and interior-most ends of the anchoring device 1110, serving in addition to their positioning function, as both interior and exterior embedment devices with interspersed exit ports 1197 and 1204. The anchoring device 1110 is provided with additional exit ports 1199 and 1205 located on and spaced around and along the medial body sections 1198. The anchoring device 1110 is also provided with a tapered and radiused end 1200 of the connecting end 1118 on the interior-most end 1116 of the anchoring device 1110 having both external self-threading thread engagement lobes 1201 and similar internal self-threading thread engagement lobes 1202.

Figure 19:
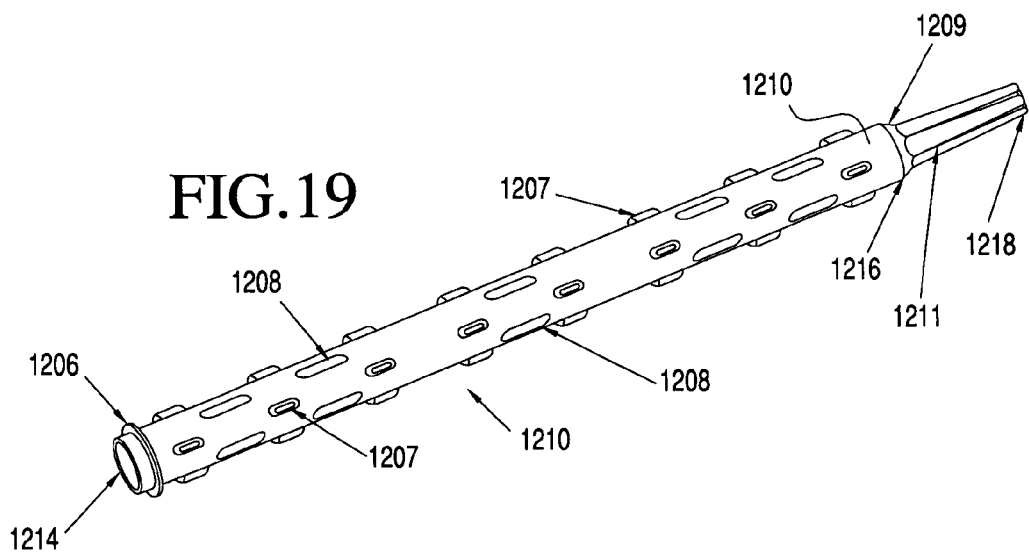
FIG. 19 is a perspective view of another anchoring device according to the present invention.

FIG. 19 shows another embodiment of the anchoring device 1210 according to the present invention wherein a outwardly projecting ring 1206 acts as an outflow limiting device preventing the escape of the injected material exteriorly to the anchoring device 1210 and wherein the concentric positioners 1207 are aligned in rows around the circumference of the anchoring device 1210, and extend along the length of the anchoring device 1210. Exit ports 1208 are patterned around the anchoring device 1210 and along its length in a differing arrangement. Insertion stop positioning means 1209 located at the interior-most end of the anchoring device 1216 at the junction between the anchoring device 1210 and the interior connecting feature 1218 including exterior tapered and radiused self-thread engagement lobes 1211 arrayed around the circumference of the secondary attachment body.

Figure 20:
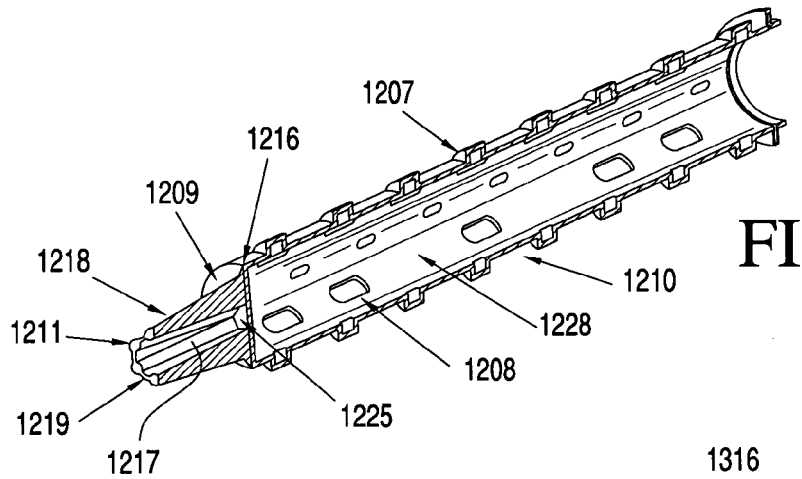
FIG. 20 is a detailed broken away longitudinal cross-section view of the connector end of the embodiment of the anchoring device shown in FIG. 19.

FIG. 20 shows the interior connecting end 1218 including interior self-threading thread engagement lobes 1217 provided with spacing between lobes 1219 to allow for dispersion of debris from the self-threading engagement action. The inclusion of open slots between the self-threading engaging lobes in place of the spaced apart lowered surfaces is another method that would create space to accommodate the dispersion of debris from the self threading action within the secondary attachment feature and this alternative configuration is included herein as an alternative embodiment. Also shown are the external self-threading engagement lobes 1211, the bulkhead 1225 separating the interior cavity of the secondary attachment device from the injected material chamber 1228. Insertion stop positioning means 1209 and injected material exit ports 1208 are also shown.

Figure 21:
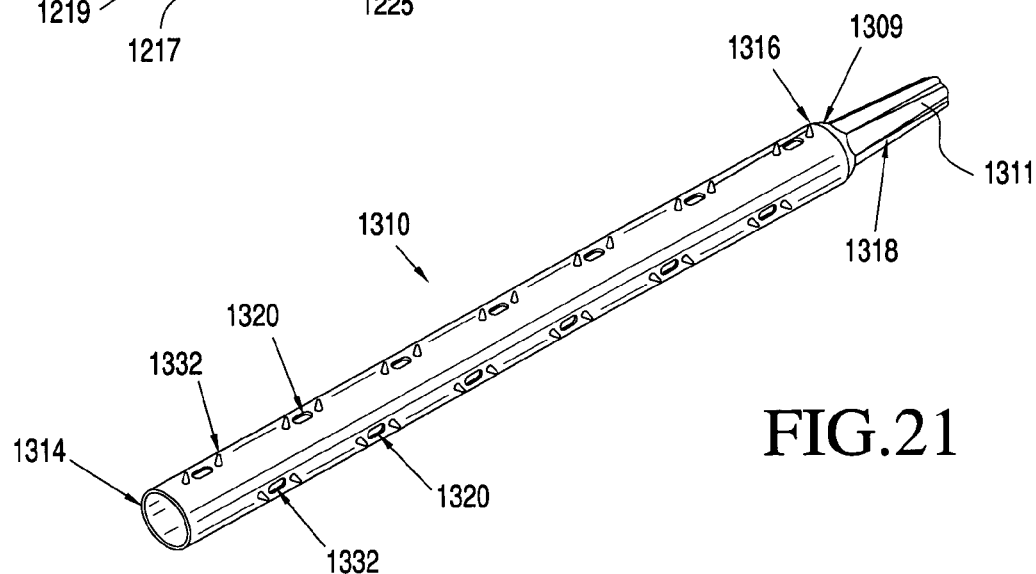
FIG. 21 is a perspective view of another anchoring device according to the present invention.

FIG. 21 shows a molded anchoring device 1310 having sharp pointed concentric positioning devices 1332 arranged around and along the length of the anchoring device 1310 to engage and retain an encapsulating sleeve in addition to providing a self-positioning function. Exit ports 1320, insertion position stop 1309, connecting end 1318, and exterior self-threading thread engagement lobes 1311 are also shown.

Figure 22:
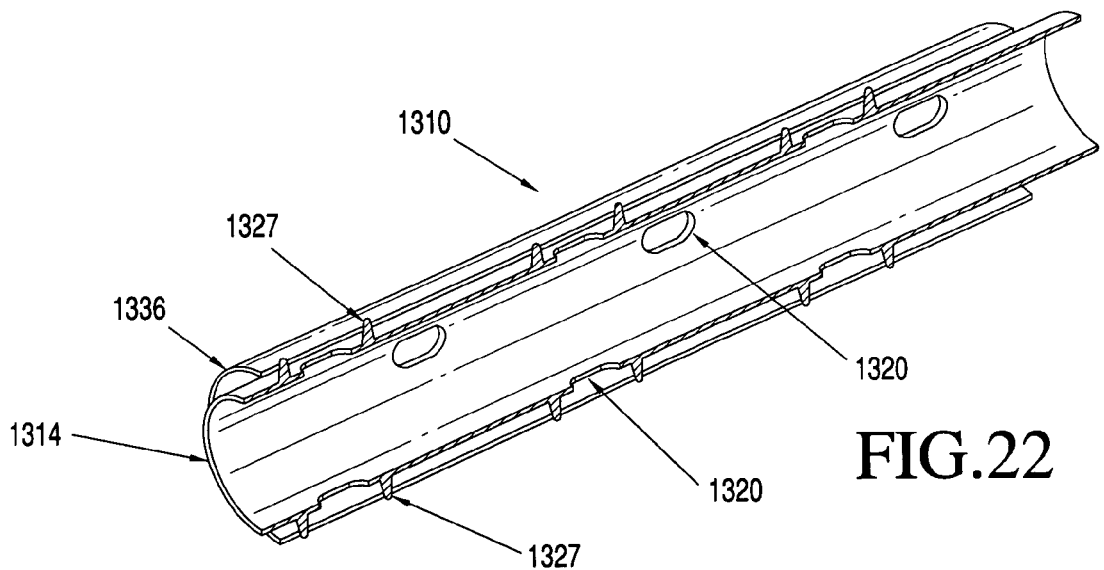
FIG. 22 is a detailed broken away longitudinal cross-sectional view of the open end of the anchoring device shown in FIG. 21 surrounded by an encapsulating sleeve.
Figure 23:
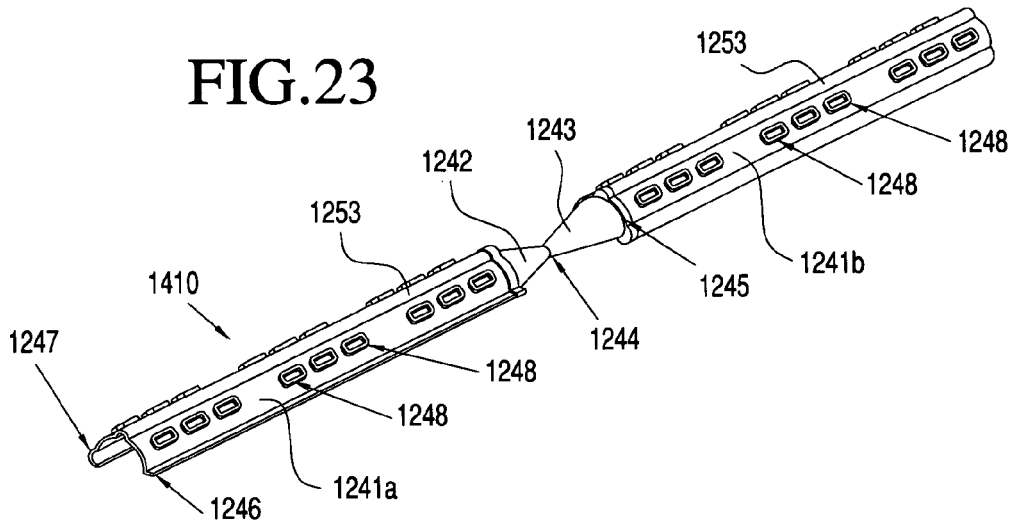
FIG. 23 is a perspective view of another embodiment of the anchoring device according to the present invention made from a one-half (½) double length shell configured to be folded back lengthwise upon itself about a central hinge element located at mid-section.
Figure 24:
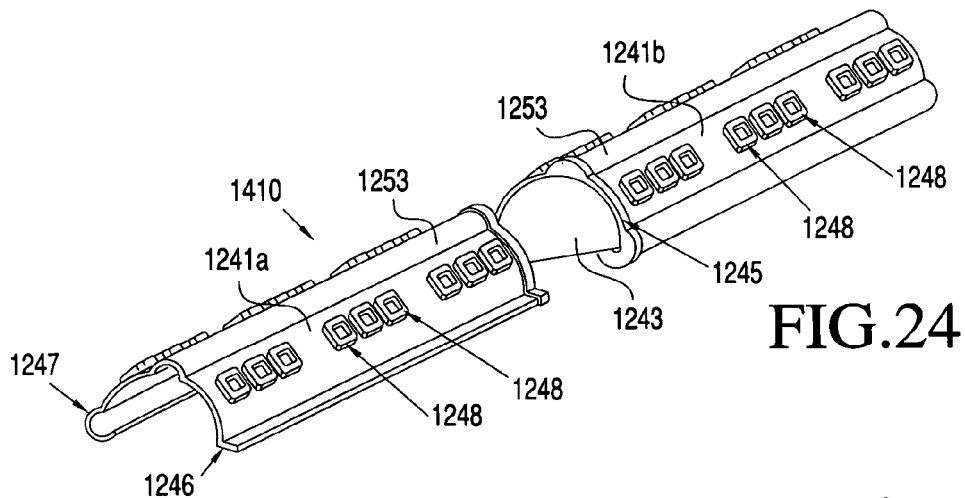
FIG. 24 is a detailed perspective view of the anchoring device according to the present invention made from a one-half (½) double length shell configured to be folded back lengthwise upon itself about a central hinge element located at mid-section as shown in FIG. 23.

FIG. 22 shows the anchoring device 1310 enclosed in an encapsulation, expandable sleeve 1336. The sleeve 1336 is positioned in a manner that contacts the concentric positioners 1327 in a manner wherein the concentric positioners 1327 pierce and penetrate the encapsulation sleeve 1336 to engage and retain the sleeve 1336 in a preferred position at 1327 along the length of the anchoring device during the insertion of the combined device into the bored hole. This engagement by the concentric positioners 1327 prevents the frictional contact between the sleeve 1336 and the rough interior of the bored holes from engaging the sleeve 1336, and causing its displacement from its preferred, evenly distributed position surrounding the anchoring device 1310.

Another embodiment of the anchoring device 1410 according to the present invention is shown in FIGS. 23-26.

The anchoring device 1410 is made from a single piece article defined by two (2) half shell bodies 1241a and 1241b connected together at connecting ends 1242 and 1243 by transverse hinge 1244. The connecting ends 1242 and 1243 of the half shell bodies 1241a and 1241b, respectively, are each provided with an insertion stop positioning means 1245. The half shell anchoring device has exit ports 1248 arranged along and about the half shell bodies 1241a and 1241b. The edges 1246 and 1247 of the half shell bodies 1241a and 1242b are configured to snap fit together upon assembly of the anchoring device 1410. The anchoring device 1410 is also provided with radial outwardly extending positioning ribs 1253.

Figure 25:
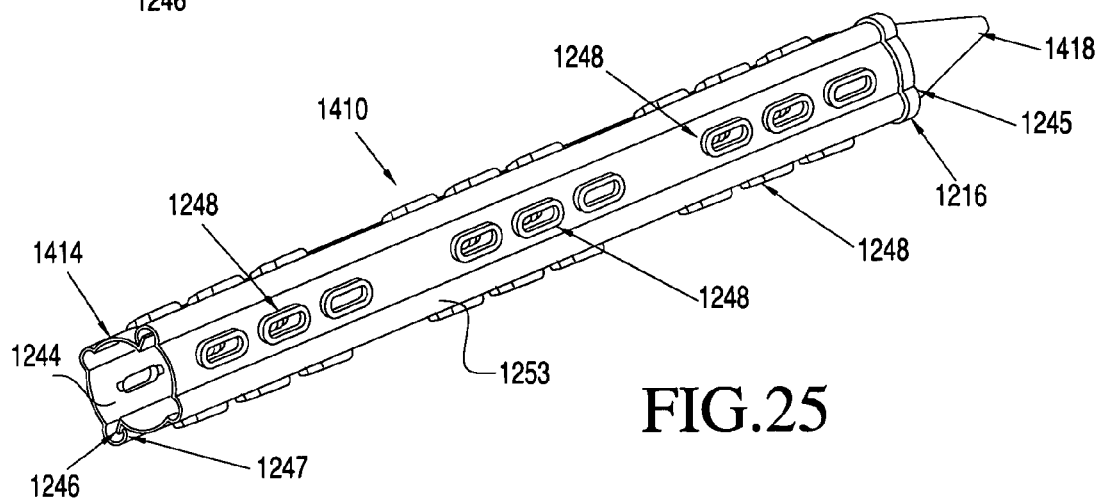
FIG. 25 is a perspective view of the assembled embodiment of the anchoring device shown in FIGS. 23 and 24.
Figure 26:
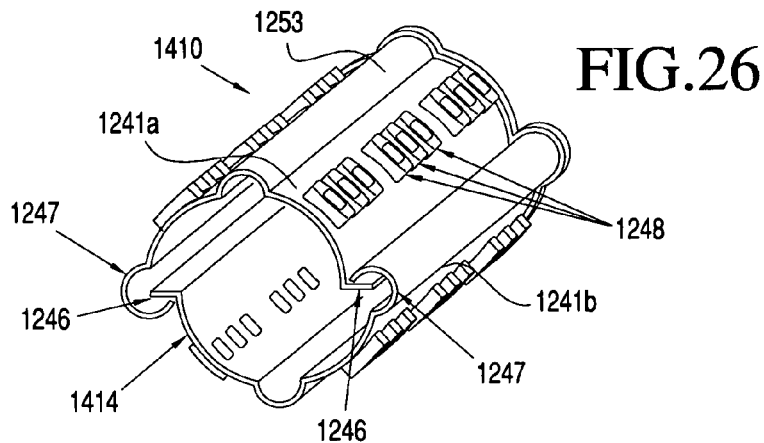
FIG. 26 is a broken away open end view of the anchoring device shown in FIG. 25.

As shown in FIGS. 25 and 26, the pair of edges 1246 and 1247 of the half shell bodies 1241a and 1241b snap fit together to form a substantially rigid anchoring device 1410. More specifically, the edges 1247 are configured to capture the edges 1246 when the half shell bodies 1241a and 1241b are folded and snap fitted together. When assembled together, the bodies 1241a and 1241b form an interior-most end 1216, an exterior-most end 1414 and a receiver 1244. The connecting ends 1242 and 1243 when joined together create an interior connecting feature 1418 similar to those previously described herein. The anchoring devices can be stored and shiped in the substantially flat shell configuration, nested one to another to conserve shipping space, and then assembled in the field just prior to installation into a hole in the masonry wall.

Figure 27:
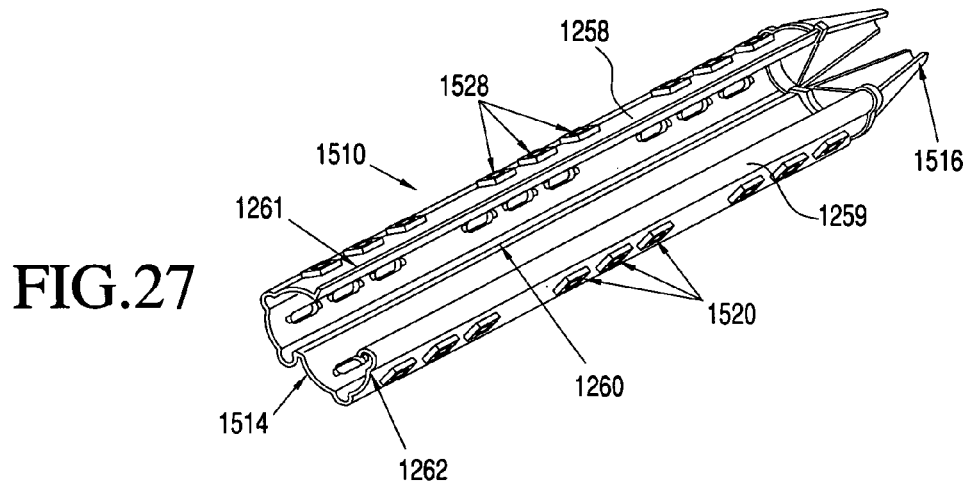
FIG. 27 is a perspective view of another embodiment of the anchoring device according to the present invention incorporating a longitudinal folding hinge.

Another embodiment of the anchoring device 1510 according to the present invention is shown in FIG. 27.

The anchoring device 1510 is made from a single piece article having two (2) half shell bodies 1258 and 1259 connected together by longitudinal hinge 1260. The anchoring device 1510 is provided with a set of edges 1261 and 1262 configured to snap fit together to form the assembled unit creating an interior-most end 1516 and an exterior-most end 1214. This alternate configuration of the present invention allows for a much compacted nested packaging of the devices to save space during shipping and storage.

Figure 28:
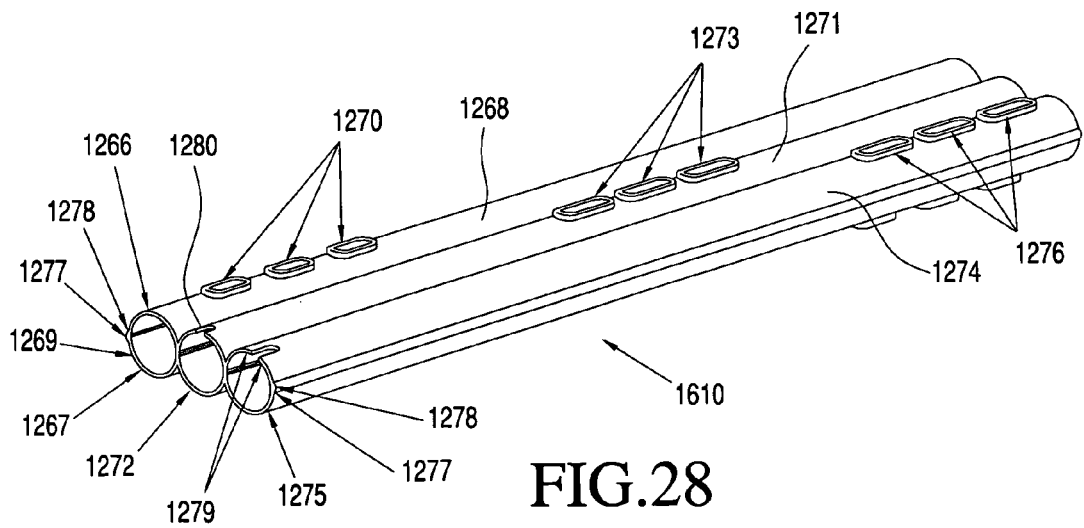
FIG. 28 is a perspective view of another embodiment of the anchoring device according to the present invention made from a one-half (½) shell having three separate passageways or chambers with each chamber having direct communication with a separate set of exit ports located at different locations along the length of the anchoring device.

Another embodiment of the anchoring device 1610 according to the present invention is shown in FIG. 28.

The anchoring device 1610 is made from two (2) separate half shell bodies 1266 and 1267 configured to snap fit together to form the assembled unit having three (3) separate flow passageways 1268, 1271 and 1274. The half shell bodies 1266 and 1267 are provided with edges 1277 and 1278 configured to snap fit together. The three (3) separate flow passageways 1268, 1271 and 1274 allow for variations in the sequence of injecting filling material through the three (3) passageways providing some control of the dispersion pattern of the injected filling material exiting from the anchoring device 1610 and control of the location and sequence of the injected filling material. Further, the three (3) separate flow passageways, if desirable, allows for the use of one (1), two (2), or three (3) different injected filling materials allowing additional variation and customization to meet the specification and requirements for a particular application.

The upper half shell 1266 and the lower half shell 1269 are joined in a manner to create the flow passageway 1268 having a receiver 1269 in communication with only the exit ports 1270. Similarly, the middle flow passageway 1271 having a receiver 1272 is in communication with only with the exit ports 1273. Similarly, the flow passageway 1274 having a receiver 1275 is in communication with only the exit ports 1276. The two (2) half shells bodies 1266 and 1267 snap fit together to form a substantially rigid anchoring device 1610 by the edges 1277 and 1278.

The anchoring device 1610 can be provided with identification markings on one or both of the half shell bodies 1279 and/or 1280 to identify the particular chamber when injecting filling material into the anchoring device 1610. The anchoring device can also be provide with additional exterior features (not shown) such at least one flow limiter, and/or a sleeve or sets of protrusions for centering the anchoring device 1610 within the hole in the masonry wall.

The anchoring device according to the present invention can be provided or fitted with a back flow restrictor 1283, as shown in FIGS. 29 and 30.

The back flow restrictor 1283 is configured to connect with the receiver of the open end of the anchoring device. For example, the back flow restrictor 1283 can be provided with a threaded connection, snap fit connection, interference fit connection, bonded, adhered, or otherwise suitably connected to the anchoring device.

The back flow restrictor 1283 is configured to allow substantially unimpeded flow of the injected material in one direction into the anchoring device while substantially preventing opposite flow out of the anchoring device (i.e. functions as a one-way flow restrictor or one-way valve). The back flow restrictor 1283 can be configured and/or adapted to each configuration or type of anchoring device according to the present invention previously described and shown.

The back flow restrictor 1283 is provided with a receiver 1284 extending to an enlarged ring-shaped protrusion 1285 configured to be engaged within the interior surface of the receiver of the open end of the anchoring device. On the inner end of the back flow restrictor 1283, a plurality of flow restricting valve fingers 1286 are provided to prevent or limit back flow of filling material injected into the anchoring device. The fingers 1286 are flexible and move under pressure during filling the anchoring device in an outwardly direction to enlarge and open the flow valve 1289. When filling is stopped, the fingers 1286 experience a reverse flow condition due to the pressure of the injected material within the anchoring device being greater than the ambient pressure, and the fingers 1286 displace in an inwardly direction narrowing the spacing between the fingers 1286 until their movement is stopped from further displacement by edgewise contact by one finger contacting edgewise with adjacent fingers to restrict back flow and close off the flow valve 1289 preventing the outflow of the injected material from the anchoring device. The configuration of the fingers 1286 allow the fingers 1286 to move in a direction to reinforce the closure of the flow valve 1289 against high pressure levels of the injected filling material located within the anchoring device. Alternative shapes, size and/or configurations of the valve fingers can be made depending on the particular application and/or type of filling material or to accommodate the needs of a multiple tube anchoring devices. For example, the fingers can be configured to have multiple bends or steps, twists or turns, rotations, offsets of fingers, one finger functionally cooperating with another, and/or multiple layers of fingers.

The anchoring device according to the present invention in either a single or multiple tube configuration can be provided with a closure cap 1291, as shown in FIG. 31.

The closure cap 1291 can be configured to snap fit directly into the anchoring device or into the back flow restrictor 1283, as shown in FIGS. 29 and 30, previously fitted or connected to the anchoring device. For example, the closure cap 1291 snaps into a locked position within the back flow restrictor 1283 by shaping the closure cap 1291 so as to have a ring-shaped protrusion 1293 configured to cooperate with and somewhat match the interior surface profile of the protrusion 1285 of the back flow restrictor 1283 when the closure cap 1291 is forceably inserted into the back flow restrictor 1283.

The closure cap 1291 is provided with flexible fingers 1292 configured to penetrate into the filling material already injected into the anchoring device. The flexibility of the fingers 1292, aided by the penetration of the fingers 1292 due to their separation, allows for easy engagement of the ring-shaped protrusion 1293 within the anchoring device. The long extension of the fingers 1294 allow the fingers to resiliently recover in shape to their unstressed position. The influence of injected filling material on the interior surfaces of the fingers 1294 further acts in a complimentary fashion to restore the shape of the fingers 1294.

The closure cap 1291 is provided with an exterior lobe 1295 configured to have an inwardly tapering outer surface or undercut geometry. The lobe 1295 is located upon a second larger exterior lobe 1296 also having an inwardly tapering outer surface or undercut geometry. The lobes 1295 and 1296 become embedded in and form retention means for a last step application of a cosmetic covering material layer such as cement applied to the hole in the masonry wall after the insertion and installation of the anchoring device and injection of the flowable and hardenable filling material into the anchoring device. The closure cap 1291 provides for a secure and inexpensive method for applying and retaining the cosmetic covering material layer to make the healing or rehabilitation of the structure harmonious with the structure's exterior and preferably undetectable by the naked eye of an observer. Additionally, this cosmetic covering layer adhering to the closure cap 1291 serves to seal the opening created for the anchoring device insertion and installation, and also to create an impenetrable barrier to the undesirable effects of water or humidity invasion. Further, this barrier beneficially works to limit the loss of interior heat or cooling, and/or to the prevent the degrading effects of ultraviolet and infrared light contacting the polymer that could otherwise act in an unfavorable manner on the chemical bonds of the polymer materials utilized in the anchoring device.

The lobes 1295 and 1296, having undercut geometric shapes, allow for the easy attachment of and engagement by auxiliary load testing equipment if desirable. These features allow the load bearing capacity of the anchoring device and its connection within and to the wall layers to be evaluated after installation within the wall layers and after the injected material has hardened. The load testing can be accomplished by easily attached equipment that grips the lobes allowing tensile test loads to be applied to the anchored connection. After the load capacity of the connection is verified, the last step of applying a cosmetic covering can be easily accomplished as previously described herein.

Other embodiments of the closure cap 1293 according to the present invention is shown in FIGS. 32-A and 32-B.

The closure cap 1393 is configured for the engagement of auxiliary wall or structure reinforcing elements or systems. Typically, wires, cables, rods, meshes, or other similar reinforcing means can be installed in a partially excavated bed and/or head joint within a masonry wall. The closure cap 1393 is configured to snap fit into the back flow restrictor 1283 shown in FIGS. 29 and 39 connected to or fitted to the anchoring device. The retention ring or protrusion 1293 is eased into engagement by the assistance of compliant fingers 1294 within the back flow restrictor 1283. In this embodiment, the compliant fingers 1294 are configured to penetrate the ring-shaped protrusion of the back flow restrictor 1283, however, the ring-shape protrusion of the closure cap 1293 can be solid with no fingers and still snap fit together with the back flow restrictor 1283.

The closure cap 1393 is provided with a repeating arrangement of self-closing snap engagement lobes 1300, in the embodiment shown in FIG. 32-A, in communication with an arrangement of elongated engagement channels or cavities 1301 distributed circumferentially to allow easy alignment with, and engagement and retention of one or more of the auxiliary wall reinforcing members previously referred to. Additionally, the features for the engagement of auxiliary wall or structure reinforcing means could be directly incorporated into the exterior most end of the anchoring device main body allowing for the elimination of the cap or other separate parts while still providing the same functional benefit.

The closure cap 1393' shown in FIG. 32-B shows an alternate configuration of arrangement of engagement cavity openings 1302' in communication with engagement channels or cavities 1303'. Depending on the specific application, each of these closure caps can be open to the primary injected filling material chamber, or can have an interior bulkhead closing off the interior injected material chamber. The separate features of the closure caps 1393 and 1393' along with the capability of receiving and engaging auxiliary reinforcing means also act as embeddable means to retain a cosmetic covering material layer in a manner similar to that previously described.

Another embodiment of the closure cap 1316 is shown in FIG. 33.

The closure cap 1316 is configured to snap fit over an open end 1714 of the anchoring device 1710. The open end of the anchoring device 1710 is provided with a beveled lead-in edge 1306 extending to a first engagement edge 1307 in communication with a second beveled lead-in edge 1308 extending to a second engagement edge 1309.

The open end 1714 of the anchoring device 1710 is shown with two engagement slots 1310 configured to cooperated with an adjacent companion engagement slots (not shown) located on the opposite sides of the open end 1714 of the anchoring device 1710. More than two (2) engagement slots can be provided in the open end 1714 of the anchoring device 1710 if desirable similar to configurations previously shown.

The closure cap 1316 is provided with a first beveled lead-in edge 1312 extending to a first engagement edge 1313 in communication with a second beveled lead-in edge 1314 extending to a second engagement edge 1315. On the interior of the closure cap 1316 is an outwardly directed beveled locking edge 1317 in communication with a captive locking cavity 1318. The closure cap 1316 when installed over the end of the anchoring device 1710 causes the sides of the open end 1714 of the anchoring device 1710 to deflect inwardly repeatedly until fully connected due to the compliance contributed from the auxiliary engagement slots 1310 and the repeated interaction of the beveled engagement edges 1306, 1312, 1308 and 1314. This inwardly directed compliance encounters the outwardly directing locking edge 1317, as the open end 1714 of the anchoring device 1710 nears full insertion and the outwardly direction locking edge 1317 forces the open end 1714 of the anchoring device 1710 outwardly as the anchoring device 1710 enters deeper into the closure cap 1316. When the anchoring device has fully entered the closure cap 1316, the outwardly forcing edge 1317 ensures that each of the engagement edges mate in pairs in full engagement (i.e. 1307 with 1315 and 1309 with 1313). This locked configuration is maintained by the open end 1714 of the anchoring device 1710 being captivated by the captive locking cavity 1318. The high elastic compliance of polymer materials allows for the full function of the interlocking aspect shown in a manner not possible in metal materials.

Due to the shorter overall length of the closure cap 1316 relative to the depth of the auxiliary engagement slots 1311, there remains clearance in the slot for the retained engagement of auxiliary wires, rods, meshes, and other similar devices as previously described in FIG. 32-A as snap fit lobes 1300 in communication with retention channel or cavity 1301 and as shown in FIG. 32-B as engagement opening 1302 in communication with retention slot or cavity 1302. It is clear that complimentary slots within the cap could be formed to act in concert with the slots 1310 in the anchoring device to allow additional variation in the engagement location of the auxiliary reinforcing means if desirable.

The outflow of the injected material flows into the cavity formed by the closure cap 1316 at the end of the anchoring device 1710 to fill the interior of the anchoring device 1710 and closure cap 1316 resulting in full embedment of the auxiliary reinforcing means and fully filling the end of the anchoring device 1710 preventing inwardly movement of the open end 1714 of the anchoring device 1710 resulting in a high strength, full embedded connection.

The outer end of the closure cap 1316 is provided with retention means or retainer 1319 for engaging and retaining an applied cosmetic covering material layer as previously herein described. The retention means 1319 located on the outer end of the closure cap 1316 additionally allows for the engagement by load testing equipment allowing the quality of the connection and the load bearing capacity of the connection to be verified if desirable before the application of cosmetically covering material.

As shown in FIG. 34, an alternate configuration of a connector end 1718 is shown separated from the anchoring device 1710, and is provided with an inwardly tapering opening entrance 1326 that assists in the alignment of and insertion of the anchoring device 1710 into a hole in an auxiliary structural system. The bulkhead 1327 between the flow passageway and the receiver of the connector end 1718 prevents the flow of injected filling material into the interior of the connector end 1718. The wall of the connector end 1718 is formed in a unique and cost-effective manner, eliminating the need for any secondary forming or tapping operation, to create interior tapering, self-threading thread engagement lobes 1328 with clearance channels 1329 to collect any debris or material pieces created during an internal self-threading action. Similarly, the exterior tapering, self-threading thread engagement lobes 1330 formed in the same instant process, and are interspersed with debris clearance channels.

Embodiment of collars 1333 and 1333' are shown in FIGS. 35-A and 35-B, respectively.

The collar 1333 is provided with a through hole 1334 configured to slide over the exterior of the connector end 1718 shown in FIG. 34 after the anchoring device 1710 has been inserted through all wall layers and into and through an auxiliary structural wall framing system until the insertion positioner stop contacts the interior surface or edge of the hole created in the auxiliary structural system. The collar 1333 is then slipped over the portion of the connector end 1718 that protrudes through the structural framing system. Acting cooperatively with the circumferentially expansion restricting nature of the bore hole, the collar surrounds the exterior of the connector end 1718 and constrains the connector end 1718 from undesirable expansion caused by the insertion and engagement of an interior attachment device, such as a lag bolt or heavy threaded screw. This exterior constraint assists in forcing the screw threads of the interior attachment device to cut into the interior lobes of the anchoring device as the screw is turned into the connector end 1718. Further, the collar 1333 creates additional load bearing area on the wall surface area to increase the strength of the overall interconnection. The correct length of collar 1333 needed is easily adjusted at the actual job site by a trim-to-length feature of the collar assisted by incremental length indicators 1336, for example, small ring-shaped notches or other interrupted forms of markings. When the collar 1333 is trimmed to the correct length and installed, the attachment device (screw, lag bolt, etc.) comes into cooperative contact with the opposing end of the collar 1337, and with the interior-most end of the connector end 1718 while the interior-most end of the collar 1333 bears against the surface of the auxiliary structural framing system.

An alternative collar 1333' shown in FIG. 35-B is provided with an expanded buttress, flange or bearing surface 1338 on one end of the device. This expanded flange 1338 can be used on the attachment device end to allow an increased surface area to support the external or internal engagement device (i.e. screw, lag bolt, star or split ring, lock washer, etc.) for engagement, or it can be used on the interior end to allow additional engagement and load bearing surface in contact with the structural framing system. As further alternatives, the collar 1333' can be provided with buttresses on both ends, or provided with an expanded, tapered or differently shaped collar bodies, ribbed supports, load spreading or distributing vanes, and other related variations.

The external collar can engage screw threads or other self-engaging means formed on the exterior of the secondary attachment device and on the interior bore of the collar allowing an interconnection to be established in this manner between the collar and the secondary attachment device allowing it to function as the sole engagement device or in cooperation with the lag bold/screw as previously described herein.

Any of the connections between the collar and the connection end of the anchoring device can be established or enhanced by the use of glues, cements, epoxies or other similar chemical or adhesive means.

Figure 36:
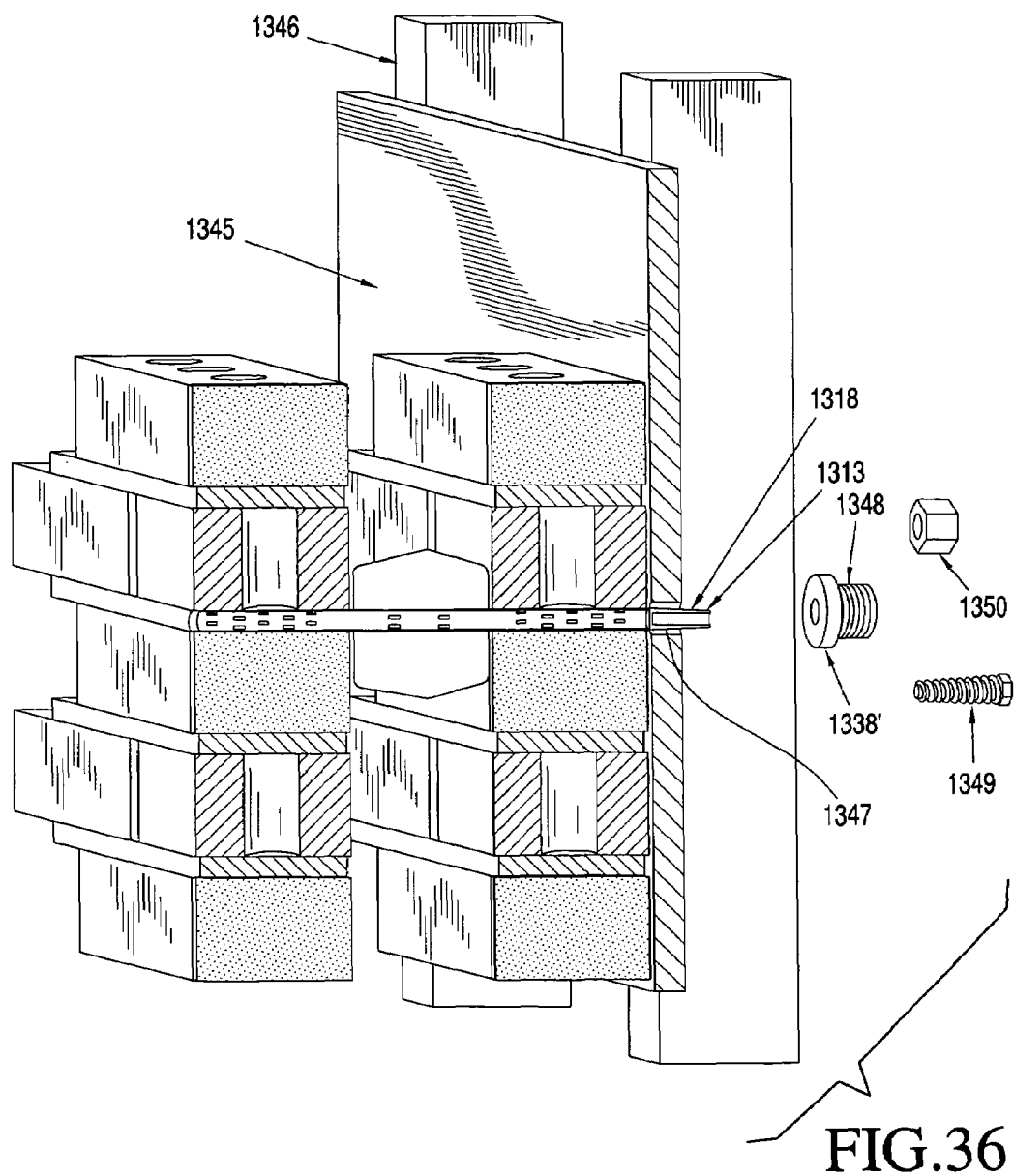
FIG. 36 is a cross-sectional perspective view of a masonry wall having two (2) brick wall layers with an anchoring device according to the present invention installed within a hole made in the masonry wall and interior building wall readied to be structurally connected to the interior wall in combination with a lag bolt and an external slip over collar reinforcing the connecting end of the anchoring device for an internal connection and showing an alternate connection means utilizing the connecting end of the anchoring device and a hex nut for an external connection with exterior thread lobes on the connecting end of the anchoring device.

FIG. 36 shows the anchoring device being attached to an auxiliary structural framing system by the exterior face of the structural framing system 1345, structural system reinforcing members 1346, and a bored hole through the structural system 1347. The secondary attachment feature or connector end 1318 is inserted into the hole in the structural system assisted by the tapered and beveled interior-most end of the anchoring device 1313 passing through the structural panel and extending past the rear surface of the structural panel. The externally tapered nature of the attachment device simplifies the insertion and centering of the attachment device within the framing system. The externally tapered feature also accommodates possible misalignment between the hole in the wall layers and the hole in the framing system such as might occur if the hole in the framing system is made separately from the hole through the wall layers. The secondary attachment reinforcing collar 1348 with the extended flange or buttress 1338 is oriented in a manner such that it will contact and bear on the interior surface of the structural panel to increase the surface area of the secondary attachment which will act to increase the load capacity of this interconnection. Located proximally to the interior-most end of the secondary attachment feature is a lag bolt/screw 1349 that could be used to complete the secondary attachment connection by a self-threaded engagement within the interior of the secondary attachment connector. Additionally shown is a coarse thread hexagonal nut 1350 which could be directly connected to the exterior of the secondary attachment feature with or without the collar to complete the secondary attachment connection to the structural framing system.

Figure 37:
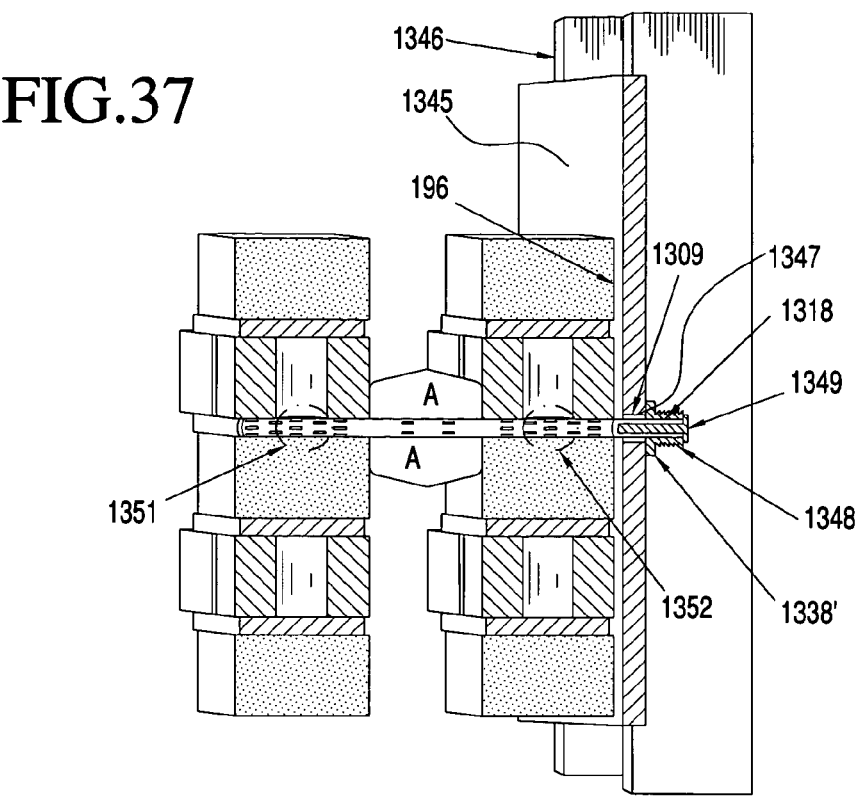
FIG. 37 is a transverse cross-sectional view of the masonry wall shown in FIG. 36 with the anchoring device fully connected with the interior wall of the building via an external slip over reinforcing collar and an internal lag bolt.

As shown in FIG. 37, the anchoring device is connected to an auxiliary structural framing system. In this view, the interior-most face 196 of an interior wall layer is shown in its proximal location to the exterior face of an auxiliary structural framing system 1345. The secondary attachment device 1318 of the anchoring device is shown extending fully through the bored hole 1347 in the structural framing system such that the insertion stop positioner 1309 contacts the front face of the structural panel and correctly positions and restrains the anchoring device from further penetration. The secondary attachment reinforcement collar body 1335 fully surrounds the exterior surface of the secondary attachment feature and the expanded flange of the collar 1338 is in contact with the interior-most surface of the auxiliary structural system providing an increased contact area with the framing system to distribute the forces and loads occurring at this juncture. Inserted into the interior of the secondary attachment feature is a lag bolt/screw 1349 seated to full depth and in full engagement with the self-threading thread engagement lobes on the interior surface of the secondary attachment device. This view shows the underside of the head of the lag bolt/screw contacting the interior-most end of the anchoring device and the interior-most end of the secondary attachment reinforcing collar to distribute the load across both devices and captivate all pieces into a firm and enduring connection between the anchoring device and the structural system.

The anchoring device is shown in full engagement with both the interior and exterior masonry wall layers, and with a fully expanded injected material buttress A filling the spacing between the wall layers. Expanded sections of injected material are also shown filling interior cavities of the brick construction elements in the front wall layer 1351 and in the rear wall layer 1352 providing additional mechanical and structural interlocking of the anchoring device, the masonry wall layers and the structural system.

Figure 38:
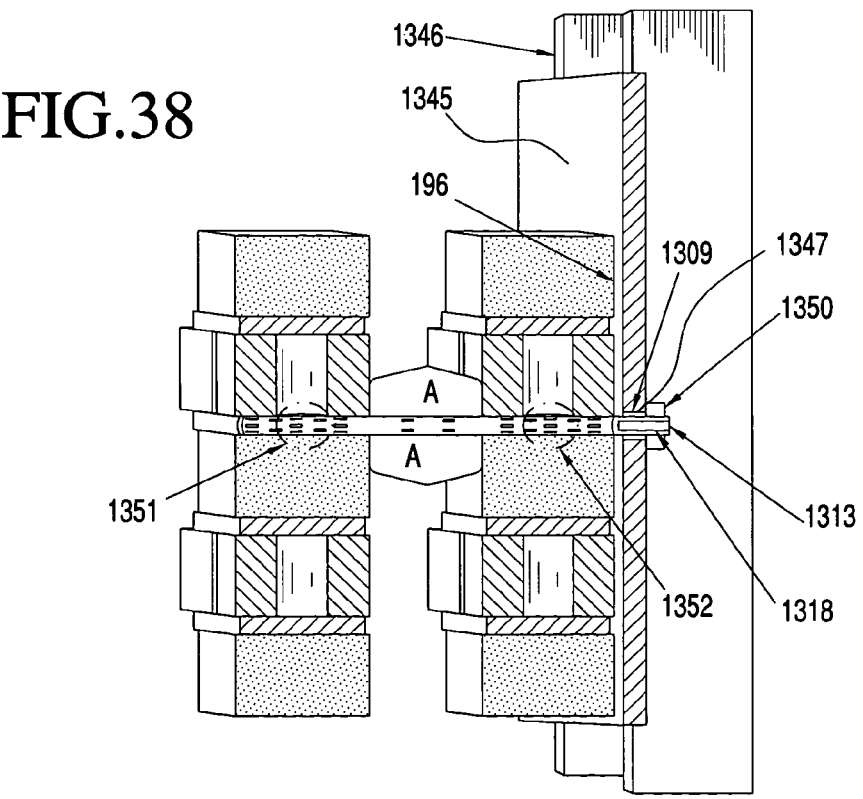
FIG. 38 is a transverse cross-sectional view of the masonry wall shown in FIG. 36 with the connecting end of the anchoring device connected to the internal wall of the building via the external hex nut.

In FIG. 38, an alternate interconnection between the anchoring device and an auxiliary structural framing system is shown. In this view, the secondary attachment feature of the anchoring device 1318 extends into and through the hole 1347 in the panel of the auxiliary structural framing system 1345 that is proximally located with the interior-most surface 196 of the interior-most wall layer. A threaded hexagonal nut 1350 is shown threaded onto the tapered exterior surface 1313 of the secondary attachment feature and engaging the exterior self-threading thread engagement lobes of the secondary attachment device. The interconnection by a hexagonal nut is but one of various possible connections that could be utilized with this unique anchoring device. Simple changes or additions to the features included in the secondary attachment device or connector end can be made to allow a snap fit engagement. Similarly, simple changes can allow an exterior engagement by a spring or "C" clip, or a plate engaging slots or grooves in the exterior of the secondary attachment device. Similarly, any number of twist-type, snap-over, or pin-through engagements can easily be made or configured. Also, the secondary attachment device creates, in addition to a connection with an auxiliary framing system, a means to attach other devices, structures or engagements on the interior-most end of the anchoring device that are inclusively encompassed within the scope of the instant invention.

Figure 39:
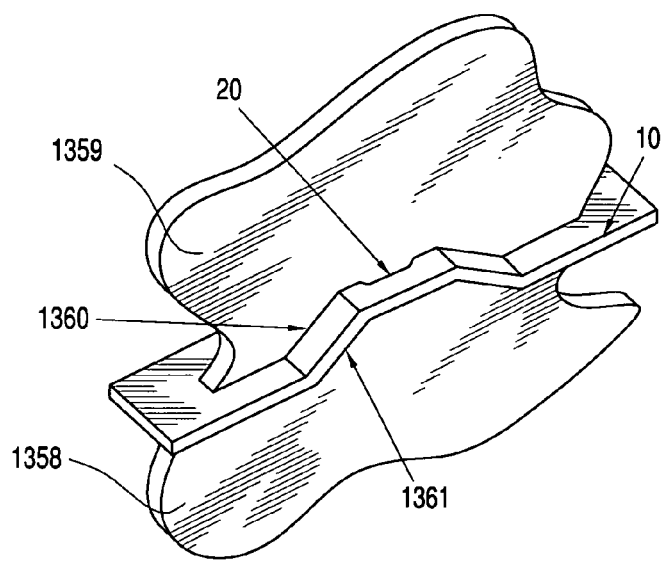
FIG. 39 is a detailed broken away perspective view of injected material flowing through an exit port in the exterior wall of the anchoring device and expanding in a distributed flow pattern external to the anchoring device.

FIG. 39 shows an exit port 20 in the wall of an anchoring device 10, the interior filling of the anchoring device with injected material 1358, and the dispersion and exterior flooding of the injected filling material 1359. The extent of the flooding or dispersion pattern around and exteriorly to the anchoring device 10 is directly related to the injected filling material utilized and its material characteristics, such as but not limited to viscosity, melt or solidification temperature, granularity, curing time and other similar characteristics, the injected material exit port configuration, shape, edge condition, spacing, and location, and exterior and interior surface deformations, irregularities, or protrusions. Also shown in this view is the interlocking connection or buttress between the exterior injected material 1359 and interior injected material 1358 shown as engaging the deformations of the exterior surface 1360 of the anchoring device 10 and the interior surface 1361 of the anchoring device 10. The anchoring device 10 creates an intimate and desirably oriented load transferring mechanism, an interior-exterior interlocking mechanism, and engagement of the anchoring device in such a manner as to favorable utilize the entirety of the material properties of the anchoring device 10 and the beneficial interactions and interconnections between the anchoring device 10 and the injected filling material. Some of the specifics of this beneficial engagement, although neither an exhausting nor limiting listing, includes tensile strength, shear load capacity, elasticity, deformation and recovery, pass-through locking buttresses created through the multiplicity of exit ports, surface deformation increasing the shear load capacity of the interconnection while limiting any shear load induced displacements, and many additional benefits. These features and benefits taken together, and with other herein described features and variations, make the anchoring device described herein a unique and versatile device whose adaptability, performance and cost-effectiveness, when taken together, surpass the entirety of the current and previously known art in a multiplicity of significant means and methods.

Figure 40:
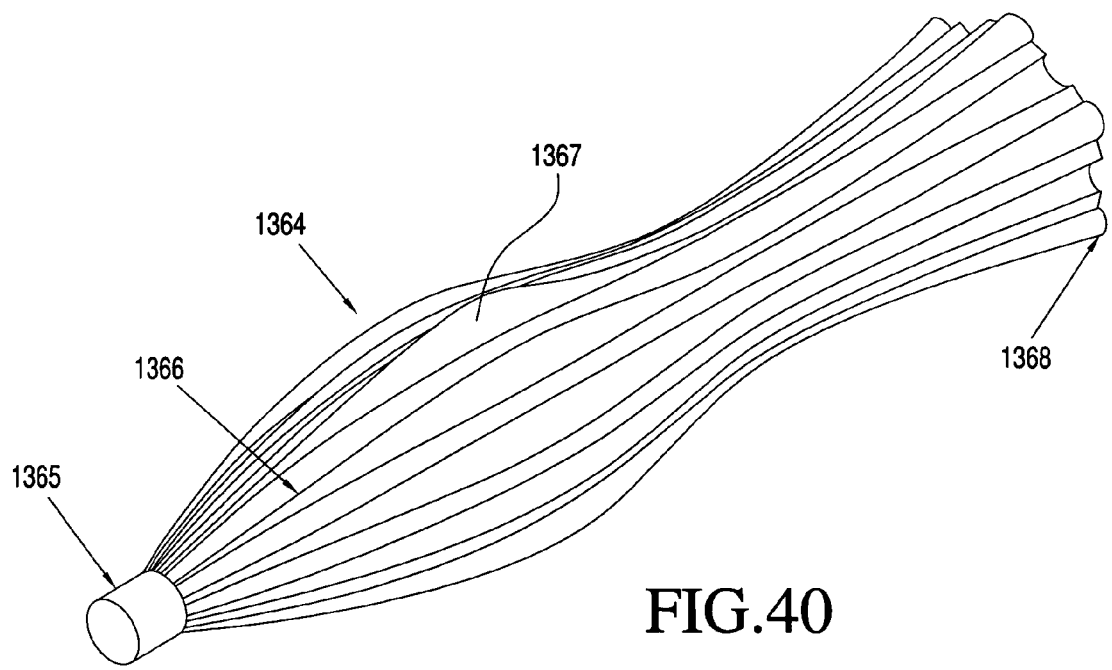
FIG. 40 is a perspective view of a thin membrane expandable encapsulation sleeve having an opening configured to connect with an anchoring device according to the present invention.

An expandable encapsulating membrane 1364 is shown in FIG. 40.

The encapsulating membrane 1364 is preferably a manufactured woven, knitted or formed, thin, expandable encapsulating membrane. The membrane may be solid semi-permeable or permeable in nature as may be required by the characteristics and composition of the injected material utilized. The membrane may be a single layer or made up of multiple overlapping layers of similar or dissimilar materials as dictated by the engineering considerations. The encapsulating membrane 1364 is provided with a controlled mating configuration orifice 1365 configured to be of a shape and size so as to favorable engage and retainably connect to the interior-most end of the anchoring device. This membrane 1364 includes a transition area 1366 located between the orifice 1365 and the expandable or deformable folded, striated or corrugated main body section 1367, and ending with an open ended exterior-most edge 1368. The membrane 1364, if manufactured by a separate process, is capable of fixed attachment to the main anchoring device body by various means including mechanical means, chemical or adhesive gluing, elastic connection, heat attachment such as thermal welding, staking or seaming, or by the simple method of limiting deformation of the mating orifice and dimensioning the same to provide a tight interconnection with the anchoring device interior-most end.

Figure 41:
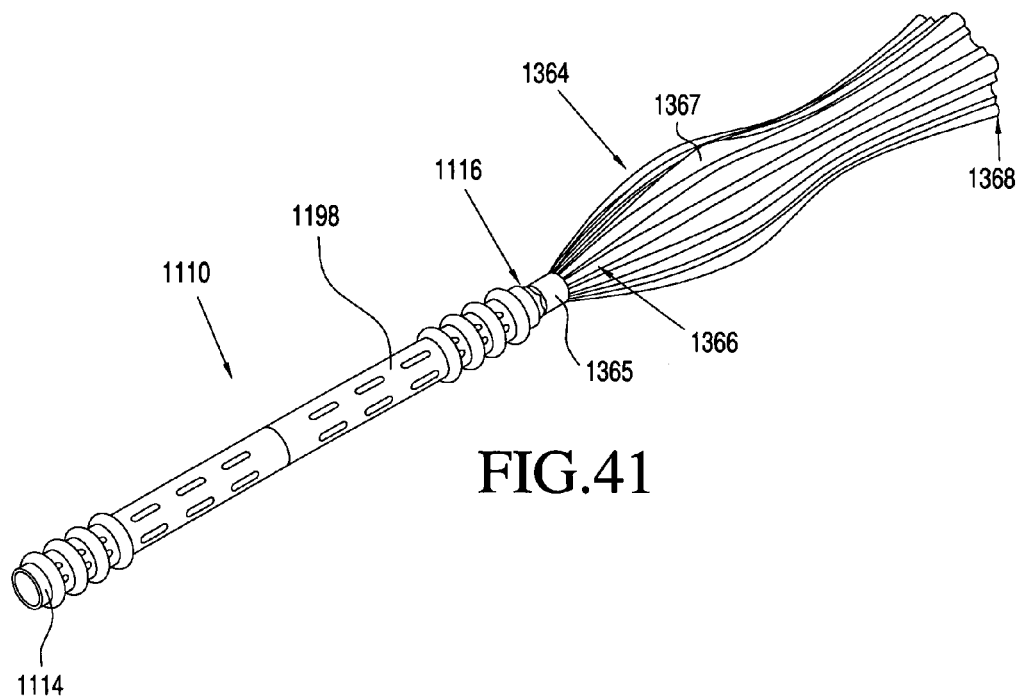
FIG. 41 is a perspective view of an anchoring device according to the present invention fitted with the thin membrane encapsulation sleeve shown in FIG. 40.

As shown in FIG. 41, the anchoring device 1110 is connected to the encapsulating membrane 1364. This view shows a method of attaching the separate expandable, encapsulating membrane 1364 to the anchoring device 1110 by installing the membrane's mating orifice 1365 over the tapered end of the secondary attachment feature or connector end of the anchoring device 1110. The membrane 1364 can be attached and retained in this configuration by physical interaction, such as elastic stretching and captive deformation recovery, or by any number of auxiliary means including mechanical, adhesive or chemical gluing, thermal attachment such as heat seaming, staking, ultrasonic or contact induced thermal welding.

The membrane shown in FIG. 41 could also be made as an integral part of the anchoring device 1110 either during the initial manufacturing process of the anchoring device 1110, such as by blow molding, wherein all anchoring device features and the membrane material are formed in a one-step, monolithic molding process or by a multiple-step process wherein the anchoring device 1110 is first formed and then inserted into secondary tooling that forms the encapsulating membrane 1364 around the anchoring device 1110, but in an intimately and fully attached manner similar to the concept of insert-molding or over-molding. Clearly, secondary mechanical attachment means, such as straps, wires, loops, string, twine, rubber bands, wire ties, tapes, clips, barbs, rings or other devices could be used to attach the membrane 1364 to the anchoring device 1110 and any such attachment can be used and are implicitly included within the scope of the instant invention.

Figure 42:
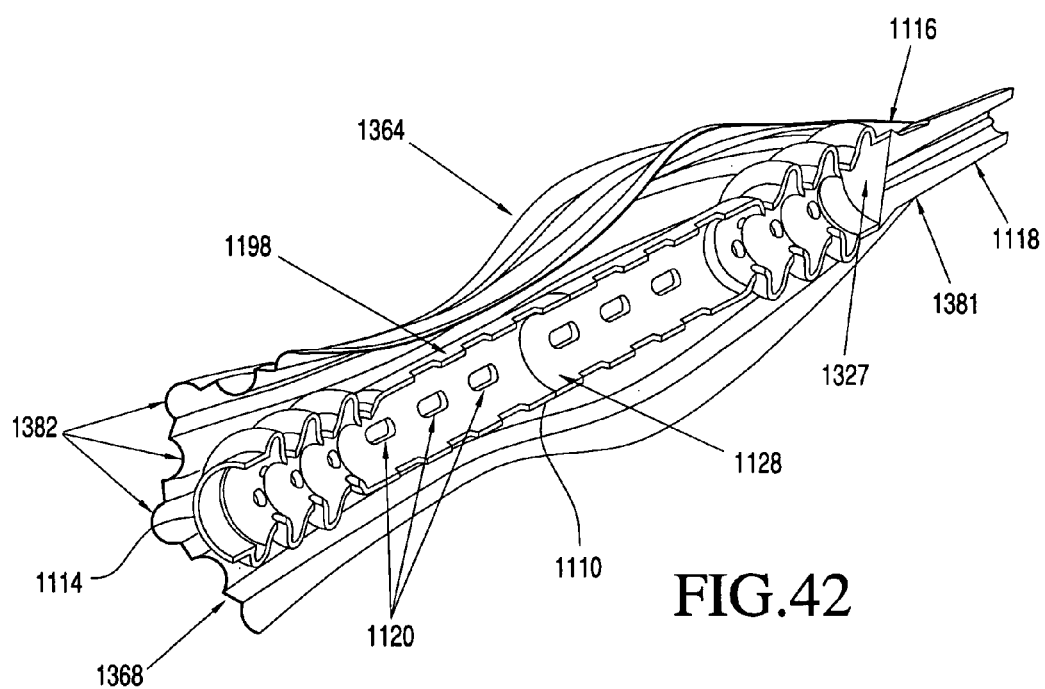
FIG. 42 is a detailed broken away longitudinal cross-sectional perspective view showing the connection between the anchoring device and thin membrane encapsulation sleeve shown in FIG. 41.

As shown in FIG. 42, the anchoring device 1110 is located within the encapsulating membrane 1364. In this view, the encapsulating membrane 1364 has been pulled in a reverse direction from that previously shown about its connection point 1381 with the anchoring device 1110. In this reversed configuration, the membrane 1364 fully encloses the primary section of the anchoring device 1110 and leaves the secondary attachment feature or connector end 1118 of the anchoring device 1110 fully exposed. The open end of the membrane 1368 is located coincident with the open end 1114 of the anchoring device 1110. Multiple pleats 1382 of the expandable membrane 1364 surround the anchoring device 1110 creating an exterior closed cavity into which the injected filling material can flow, disperse and expand while still be somewhat contained after passing through the flow passageway 1128, and exit via the exit ports 1120. Also shown in this view is the interior chamber bulkhead 1327, which separates the flow passageway 1128 from the secondary attachment feature or connector end 1118.

As shown in FIGS. 43-A to 43-C, the anchoring device 1110 is provided with the expandable encapsulating membrane 1364. In FIG. 43-A, the anchoring device 1110 and encapsulating membrane 1364 have just begun receiving the injected filling material, and the filling material is just starting to flow into the open end 1114 of the anchoring device 1110, and down the flow passageway. Some of the injected filling material is starting to flow out the exterior-most located injected material exit ports 1120 resulting in a slight localized swelling 1386 of the encapsulating membrane. The expandable membrane 1364 is closed at the exterior-most end 1236 and retainable engaged at 1237 by the interconnection between the concentric positioning devices 1190 on the anchoring device 1110 and the encapsulation membrane 1364.

In FIG. 43-B, the anchoring device 1110 and encapsulation membrane 1364 are in a partially filled condition wherein the injected filling material has flowed down the flow passageway of the anchoring device 1110, out through the exit ports 1120, and into the cavity between the exterior of the anchoring device 1110 and the interior surface of the encapsulating membrane 1364 resulting in the partial expansion of the forward edge of the middle section of the encapsulating membrane 1364.

In FIG. 43-C, the anchoring device 1110 and encapsulation membrane 1364 are in a fully filled condition wherein the exterior flow of the injected filling material has fully expanded the middle section of the encapsulation membrane 1364 forming a forward buttress edge 1390, and a rear buttress edge 1395. The continued flow of the injected filling material to the interior-most end of the anchoring device 1110 and its passage through the flow passageway thereof has expanded the interior-most section 1396 of the encapsulation membrane 1364. Also shown is the expansion limitation 1397 resulting from the attachment of the encapsulation membrane 1364 to the interior-most end of the anchoring device 1110.

Although a generally tubular anchoring device has been disclosed, other geometric shapes could function satisfactorily. It would be readily apparent to those skilled in the art that there are changes, modifications and improvements that may be made therein without departing from the spirit and scope thereof as previously defined and envisioned and as may hereinafter be claimed. Because many varying and different embodiments may be made within the scope of this inventive concept herein taught, and because many modifications may be made in the embodiments herein detailed in accordance with the descriptive requirements of the law, it is to be understood that the details herein are to be interpreted as illustrative and not in a limiting sense.

What I claim is:

1. A masonry wall anchoring device configured for reinforcing and stabilizing an existing brick wall having an outer brick wall and an inner brick wall, said anchoring device comprising:

an anchoring tube having a first open end configured to releasably couple with a material injection device and a second opposite closed end, said anchoring tube configured to substantially fit within a hole provided in the brick wall extending through the outer brick wall into the inner brick wall, said anchoring tube including a passageway for delivering material from the material injection device to spaced apart locations within the brick wall and being provided with a first set of exit ports spaced apart from a second set of exit ports extending through a wall portion of said anchoring tube, said first set of exit ports located in a portion of the hole through the outer brick wall and said second set of exit ports located in a portion of the hole through the inner brick wall, including at least one positioning device configured for positioning said anchoring tube within the hole provided in the brick wall, said at least one positioning device being a plurality of positioning devices extending radial outwardly from said anchoring device, said positioning devices are finger-like projections extending radially outward from said anchoring tube, whereby the outer brick wall is tied to said inner brick wall when said anchoring tube is installed in the hole in the brick wall and filling material is injected into said anchoring tube to expand said anchoring tube radial outwardly and to allow said filling material to flow through said passageway of said anchoring tube and flow out said sets of exit ports to fill and secure said anchoring tube in the hole portions through said outer and inner brick walls.

2. A device according to claim 1, wherein said positioning device includes a ring-like projection extending radial outwardly from said anchoring tube.

3. A device according to claim 1, wherein said anchoring tube is provided with additional exit ports located between said first set of exit ports and said second set of exit ports to allow filling material to flow out of said passageway into a space located between said outer brick wall and said inner brick wall and around said anchoring tube.

4. A device according to claim 3, wherein said plurality of exit ports are located at different positions along a length of the anchoring tube and are located at different radial positions at each position along a length of the anchoring tube.

5. A device according to claim 1, wherein said anchoring tube is provided with said plurality of protrusions located adjacent said exit ports.

6. A device according to claim 5, wherein said plurality of protrusions are located at different positions along a length of the anchoring tube.

7. A device according to claim 1, wherein said plurality of protrusions are located at spaced apart locations along a length of the anchoring tube at different radial positions.

8. A device according to claim 1, wherein said anchoring tube is provided with at least one expandable wall portion configured to expand radial outwardly from said anchoring tube when said anchoring tube is being filled with material under pressure.

9. A device according to claim 1, wherein said anchoring tube is provided with at least one expandable wall portion configured to expand radial outwardly from said anchoring tube when said anchoring tube is being filled with material under pressure.

10. A device according to claim 1, including an attachment device configured for connecting said anchoring tube to interior framing of a building.

11. A device according to claim 10, wherein said attachment device is a threaded extension of said anchoring tube configured to fit through a hole drilled through the framing secured with a threaded fastener.

12. A device according to claim 1, wherein said anchoring tube is configured to substantially expand radial outwardly when filled with material under pressure.

* * * * *